(12) United States Patent
Wang et al.

(10) Patent No.: US 12,407,256 B2
(45) Date of Patent: Sep. 2, 2025

(54) SWITCHING REGULATOR AND CONTROL METHOD THEREOF

(71) Applicant: Richtek Technology Corporation, Hsinchu (TW)

(72) Inventors: Jiing-Horng Wang, Hsinchu (TW); Yu-Pin Tseng, Miaoli (TW); Chia-Jung Chang, Hsinchu (TW); Tsan-He Wang, New Taipei (TW); Shao-Ming Chang, Keelung (TW)

(73) Assignee: Richtek Technology Corporation, Hsinchu (TW)

( * ) Notice: Subject to any disclaimer, the term of this patent is extended or adjusted under 35 U.S.C. 154(b) by 201 days.

(21) Appl. No.: 18/493,826

(22) Filed: Oct. 25, 2023

(65) Prior Publication Data
US 2024/0171074 A1  May 23, 2024

(30) Foreign Application Priority Data
Nov. 22, 2022 (TW) ................... 111144678

(51) Int. Cl.
*H02M 3/158* (2006.01)
*H02M 3/157* (2006.01)
*H02M 3/335* (2006.01)

(52) U.S. Cl.
CPC ............ *H02M 3/158* (2013.01); *H02M 3/157* (2013.01); *H02M 3/33507* (2013.01)

(58) Field of Classification Search
CPC ...... H02M 3/158; H02M 3/157; H02M 3/155; H02M 3/156; H02M 3/1563; H02M 3/1586; H02M 3/33507; H02M 3/33515; H02M 3/335
See application file for complete search history.

(56) References Cited

U.S. PATENT DOCUMENTS

| | | | |
|---|---|---|---|
| 8,169,198 B2* | 5/2012 | Lin ....................... | H02M 3/158 323/222 |
| 2023/0208296 A1* | 6/2023 | Zhang ................... | H02M 3/157 323/271 |
| 2025/0175080 A1* | 5/2025 | D'Souza ............. | H02M 1/0038 |

* cited by examiner

*Primary Examiner* — Nguyen Tran
(74) *Attorney, Agent, or Firm* — Huan-Yi Lin

(57) ABSTRACT

A switching regulator includes: a power stage circuit, a control circuit and an operation clock signal generator circuit. The operation clock signal generator circuit includes: a time point option unit generating a time point option signal according to a phase node voltage during a ringing period subsequent to a blanking period, to indicate at least one available turn-on time point, or generating a lowest voltage time point signal according to the phase node voltage during a tolerance period, to indicate a lowest voltage time point; and a time point deciding unit deciding the tolerance period according to a base clock signal and a tolerable frequency range and select the available turn-on time point or the lowest voltage time point within the tolerance period as a decided time point, to generate the operation clock signal.

44 Claims, 16 Drawing Sheets

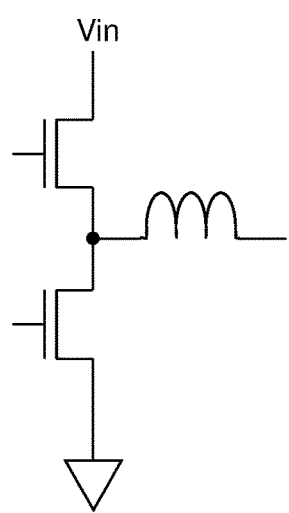
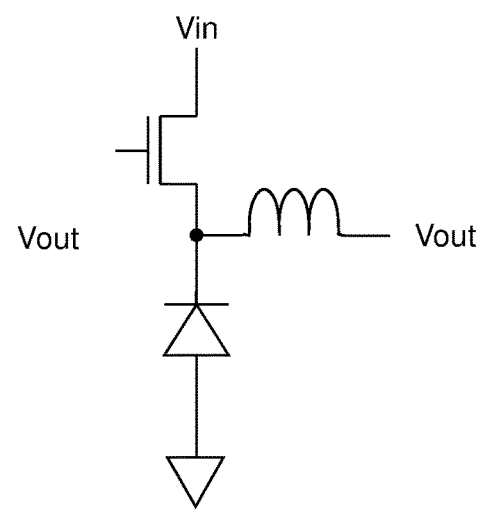
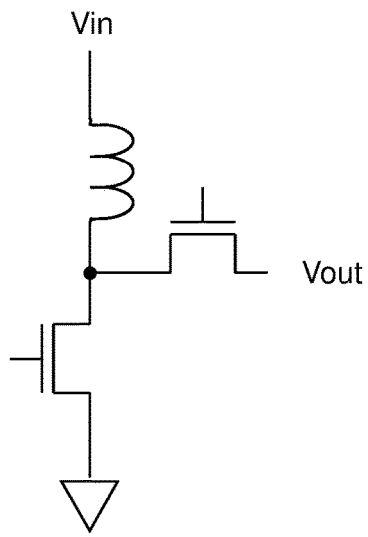
Fig. 3A  Fig. 3B  Fig. 3C
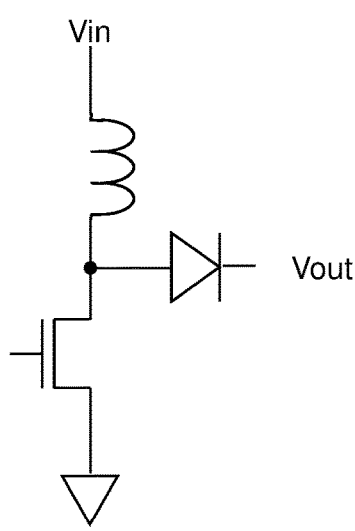
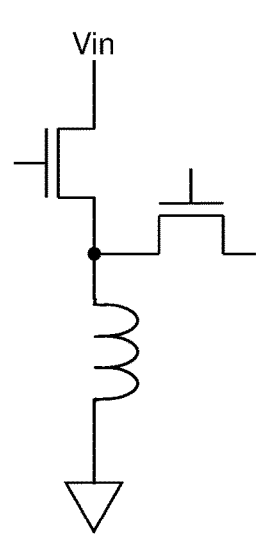
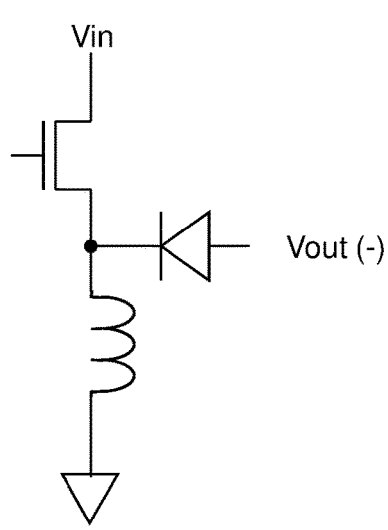
Fig. 3D  Fig. 3E  Fig. 3F

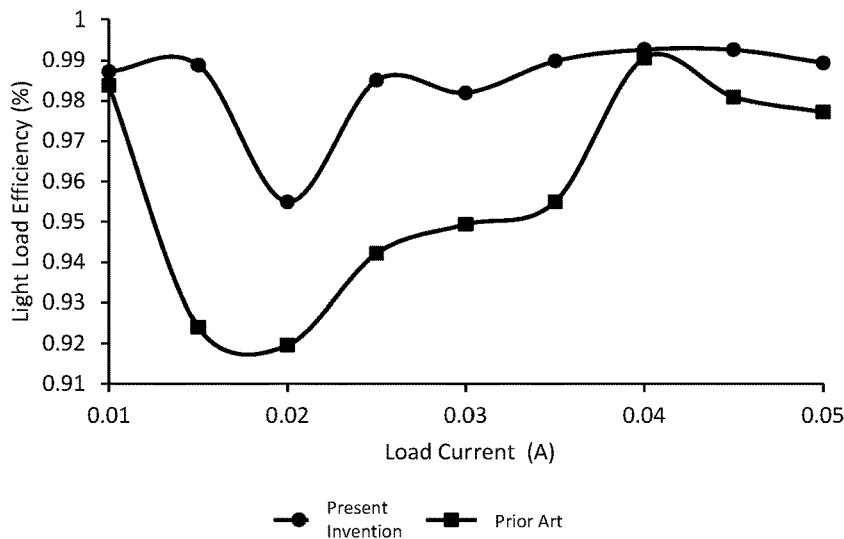

301 Generating a time point option signal according to a phase node voltage of the phase node during a ringing period subsequent to a blanking period, to indicate at least one available turn-on time point, or
generating a lowest voltage time point signal according to the phase node voltage during a tolerance period, to indicate a lowest voltage time point

302 Deciding the tolerance period according to a base clock signal and a tolerable frequency range, and selecting the turn-on time point or the lowest voltage time point which occurs within the tolerance period to be a decided time point, to generate the operation clock signal

303 Generating a blanking signal which defines the blanking period

3031 Comparing the phase node voltage with a first voltage threshold, to generate a comparison result

3032 Deciding the ending time point of the blanking period according to the comparison result and deciding the beginning time point of the blanking period according to the PWM signal, so as to generate the blanking signal

Fig. 19

SWITCHING REGULATOR AND CONTROL METHOD THEREOF

CROSS REFERENCE

The present invention claims priority to TW 111144678 filed on Nov. 22, 2022.

BACKGROUND OF THE INVENTION

Field of Invention

The present invention relates to a switching regulator and a control method thereof; particularly, it relates to such a switching regulator capable of operating substantially in constant frequency and having an improved light load efficiency, and a control method thereof.

DESCRIPTION OF RELATED ART

FIG. 1 is a diagram showing the light load efficiency and phase node voltage when the lower gate switch is ON in a conventional switching regulator. As shown in FIG. 1, because this conventional switching regulator adopts a single constant switching frequency and because this conventional switching regulator is unable to achieve zero voltage switching (ZVS), the phase node voltage when the lower gate switch is ON is sometimes low (e.g., at a valley) and is sometimes high (e.g., at a peak). As a result, the prior art shown in FIG. 1 has an unstable light load efficiency; the light load efficiency is better only when the phase node voltage is close to the valley.

In another prior art, the time point when the lower gate switch is turned ON is adjusted by taking zero voltage switching into consideration, so as to control the time point when the lower gate switch is turned ON to be at a time point when the phase node voltage of the lower gate switch is zero to achieve zero voltage switching, thereby improving the power conversion efficiency. Nevertheless, this involves adjusting operation frequency and the operation frequency may be beyond a range acceptable by a load circuit which is required to operate in constant frequency. That is, when a load circuit is required to operate in a specific range (e.g., an LED driver which is applied in a touch screen with a stylus), zero voltage switching cannot be smoothly achieved. A relevant prior art is U.S. Pat. No. 8,629,660B2.

In view of the above, to overcome the drawbacks in the prior art, the present invention proposes a switching regulator which is capable of operating substantially in constant frequency and having an improved light load efficiency, and a control method thereof.

SUMMARY OF THE INVENTION

From one perspective, the present invention provides a switching regulator, comprising: a power stage circuit, which is configured to operably control at least one power switch according to a pulse width modulation (PWM) signal, to switch an inductor coupled to a phase node, thus converting an input voltage to an output voltage; a control circuit, which is configured to operably generate the PWM signal according to an operation clock signal; and an operation clock signal generator circuit, which is configured to operably generate the operation clock signal, wherein the operation clock signal generator circuit includes: a time point option unit, which is configured to operably generate a time point option signal according to a phase node voltage of the phase node during a ringing period subsequent to a blanking period, to indicate at least one available turn-on time point, or which is configured to operably generate a lowest voltage time point signal according to the phase node voltage during a tolerance period, to indicate a lowest voltage time point; and a time point deciding unit, which is configured to operably decide the tolerance period according to a base clock signal and a tolerable frequency range and which is configured to operably select the available turn-on time point or the lowest voltage time point which occurs within the tolerance period to be a decided time point, so as to generate the operation clock signal; wherein the decided time point is a time point which corresponds to a lowest phase node voltage within the tolerance period or an ending time point of the tolerance period; wherein a beginning time point of the tolerance period is a time point obtained by counting a shortest tolerance period from a previous decided time point, wherein the shortest tolerance period corresponds to a highest frequency of the tolerable frequency range; wherein an ending time point of the tolerance period is a time point obtained by counting a longest tolerance period from a previous decided time point, wherein the longest tolerance period corresponds to a lowest frequency of the tolerable frequency range; wherein the ringing period occurs during a dead time when the switching regulator operates in a discontinuous conduction mode (DCM).

In one embodiment, herein the operation clock signal generator circuit further includes: a blanking unit, which is configured to operably generate a blanking signal for defining the blanking period, wherein the blanking unit is configured to operably decide a beginning time point of the blanking period according to the PWM signal; wherein an ending time point of the blanking period is decided by the blanking unit according to the phase node voltage, or the ending time point of the blanking period is decided by selecting a time point prior to the beginning time point of the tolerance period.

In one embodiment, the available turn-on time point is correlated with a valley time point of a ringing signal of the phase node voltage during the ringing period.

In one embodiment, the power stage circuit includes a boost power stage circuit, wherein the output voltage is not lower than 2-fold of the input voltage.

In one embodiment, the ringing period is correlated with an inductance of the inductor and an equivalent capacitance at the phase node.

In one embodiment, the blanking unit includes: a comparison circuit, which is configured to operably compare the phase node voltage with a first voltage threshold, to generate a comparison result; and a logic circuit, which is configured to operably decide the ending time point of the blanking period according to the comparison result and which is configured to operably decide the beginning time point of the blanking period according to the PWM signal, so as to generate the blanking signal.

In one embodiment, the first voltage threshold includes: a common mode voltage or a knee voltage of the phase node voltage.

In one embodiment, in a case when the time point option unit is configured to generate the time point option signal according to the phase node voltage of the phase node during the ringing period subsequent to the blanking period, the time point option unit includes: a time point searching circuit, which is configured to operably generate a time point searching result according to the blanking signal and the phase node voltage, wherein the time point searching result indicates an occurrence time point of at least one valley or at least one peak of the phase node voltage within the ringing period; and a time point determination circuit, which is configured to operably decide whether each of the occurrence time point of the at least one valley or the at least one peak in the time point searching result is the available turn-on time point, so as to decide at least one available turn-on time point, thereby generating the time point option signal; wherein the time point searching circuit is disabled at the beginning time point of the blanking signal, whereas, the time point searching circuit is enabled at the ending time point of the blanking signal.

In one embodiment, the time point searching circuit includes: a differentiator circuit, which is configured to operably execute a differentiation operation on the phase node voltage, to generate a differentiation signal; and a comparison circuit, which is configured to operably compare the differentiation signal with a common mode signal of the differentiation signal, to generate the time point searching result.

In one embodiment, the time point searching circuit includes: an integrator circuit, which is configured to operably execute an integration operation on the phase node voltage, to generate an integration signal; and a comparison circuit, which is configured to operably compare the integration signal with a common mode signal of the integration signal, to generate the time point searching result.

In one embodiment, the time point searching circuit includes: a current sensing circuit, which is configured to operably sense a current flowing through the phase node, to generate a current signal; and a comparison circuit, which is configured to operably compare the current signal with a common mode signal of the current signal, to generate the time point searching result.

In one embodiment, the time point determination circuit is configured to operably decide whether each of the occurrence time point of the at least one valley or the at least one peak in the time point searching result is the available turn-on time point according to whether the phase node voltage corresponding to each of the occurrence time point is lower than a second voltage threshold.

In one embodiment, the second voltage threshold includes: a common mode voltage of the phase node voltage.

In one embodiment, the time point determination circuit is configured to operably count a sequence order of each of the occurrence time point of the at least one valley or the at least one peak in the time point searching result, so as to decide whether each of the occurrence time point of the at least one valley or the at least one peak in the time point searching result is the available turn-on time point.

In one embodiment, when the sequence order of the occurrence time point of the at least one valley or the at least one peak is an odd, the time point determination circuit decides this occurrence time point of the at least one valley or the at least one peak is the available turn-on time point.

In one embodiment, the time point deciding unit includes: a frequency divider, which is configured to operably generate a high frequency clock signal and a low frequency clock signal according to the base clock signal, the tolerable frequency range and the PWM signal; and a tolerance period generation circuit, which is configured to operably generate a tolerance period signal according to the high frequency clock signal and the PWM signal, wherein the tolerance period signal is indicative of the tolerance period; wherein when the time point option signal and the tolerance period signal are both at an enable level, the operation clock signal is generated, or otherwise, the operation clock signal is generated at a rising time point of the low frequency clock signal.

In one embodiment, the time point deciding unit further includes: an edge detection circuit, which is configured to operably detect a rising edge of the low frequency clock signal, to decide the rising time point of the low frequency clock signal.

In one embodiment, the power stage circuit includes: a buck power stage circuit, a boost power stage circuit, a buck-boost power stage circuit or a flyback power stage circuit.

In one embodiment, the common mode voltage of the phase node voltage includes: the input voltage.

In one embodiment, the common signal includes: the input voltage.

In one embodiment, when the time point option unit is configured to operably generate the lowest voltage time point signal during the tolerance period, the time point option unit includes: a sample-and-hold circuit, which is enabled by a tolerance period signal and which is configured to operably sample and hold a plurality of the phase node voltages during the tolerance period, to generate the time point option signal; and a lowest value selector coupled to the sample-and-hold circuit, wherein the lowest value selector is configured to operably select a lowest phase node voltage among the plurality of the phase node voltages, to generate the lowest voltage time point signal, wherein the lowest voltage time point signal is indicative of the lowest voltage time point.

In one embodiment, the time point deciding unit includes: a frequency divider, which is configured to operably generate a high frequency clock signal and a low frequency clock signal according to the base clock signal, the tolerable frequency range and the PWM signal; a tolerance period generation circuit, which is configured to operably generate a tolerance period signal according to the high frequency clock signal and the PWM signal, wherein the tolerance period signal is indicative of the tolerance period; and a finite-state machine (FSM), which is configured to operably generate the operation clock signal according to the lowest voltage time point signal and the low frequency clock signal.

From another perspective, the present invention provides a control method for controlling a switching regulator, wherein the switching regulator includes: a power stage circuit, which is configured to operably control at least one power switch according to a pulse width modulation (PWM) signal, to switch an inductor coupled to a phase node, thus converting an input voltage to an output voltage; the control method comprising following steps: generating a time point option signal according to a phase node voltage of the phase node during a ringing period subsequent to a blanking period, to indicate at least one available turn-on time point, or generating a lowest voltage time point signal according to the phase node voltage during a tolerance period, to indicate a lowest voltage time point; and deciding the tolerance period according to a base clock signal and a tolerable frequency range and selecting the available turn-on time point or the lowest voltage time point which occurs within the tolerance period to be a decided time point, so as to generate the operation clock signal; wherein the decided time point is a time point which corresponds to a lowest phase node voltage within the tolerance period or an ending time point of the tolerance period; wherein a beginning time point of the tolerance period is a time point obtained by counting a shortest tolerance period from a previous decided time point, wherein the shortest tolerance period corresponds to a highest frequency of the tolerable frequency range; wherein an ending time point of the tolerance period is a time point obtained by counting a longest tolerance period from a previous decided time point, wherein the longest tolerance period corresponds to a lowest frequency of the tolerable frequency range.

In one embodiment, the control method further comprises: generating a blanking signal which defines the blanking period; wherein a beginning time point of the blanking period is decided according to the PWM signal, and an ending time point of the blanking period is decided according to the phase node voltage, or the ending time point of the blanking period is decided by selecting a time point prior to the beginning time point of the tolerance period.

In one embodiment, the step for generating the blanking signal includes: comparing the phase node voltage with a first voltage threshold, to generate a comparison result; and deciding the ending time point of the blanking period according to the comparison result and deciding the beginning time point of the blanking period according to the PWM signal, so as to generate the blanking signal.

In one embodiment, the step for generating the time point option signal according to the phase node voltage of the phase node during the ringing period subsequent to the blanking period includes: generating a time point searching result according to the blanking signal and the phase node voltage, wherein the time point searching result indicates an occurrence time point of at least one valley or at least one peak of the phase node voltage within the ringing period; and determining whether each of the occurrence time point of the at least one valley or the at least one peak in the time point searching result is the available turn-on time point, to decide at least one available turn-on time point, thereby generating the time point option signal.

In one embodiment, the step for generating the time point searching result according to the blanking signal and the phase node voltage includes: executing a differentiation operation on the phase node voltage, to generate a differentiation signal; and comparing the differentiation signal with a common mode signal of the differentiation signal, to generate the time point searching result.

In one embodiment, the step for generating the time point searching result according to the blanking signal and the phase node voltage includes: executing an integration operation on the phase node voltage, to generate an integration signal; and comparing the integration signal with a common mode signal of the integration signal, to generate the time point searching result.

In one embodiment, the step for generating the time point searching result according to the blanking signal and the phase node voltage includes: sensing a current flowing through the phase node, to generate a current signal; and comparing the current signal with a common mode signal of the current signal, to generate the time point searching result.

In one embodiment, the step for determining whether each of the occurrence time point of the at least one valley or the at least one peak in the time point searching result is the available turn-on time point is determined according to whether the phase node voltage corresponding to each of the occurrence time point of the at least one valley or the at least one peak in the time point searching result is lower than a second voltage threshold.

In one embodiment, the step for determining whether each of the occurrence time point of the at least one valley or the at least one peak in the time point searching result is the available turn-on time point includes: counting a sequence order of each of the occurrence time point of the at least one valley or the at least one peak in the time point searching result.

In one embodiment, the step for deciding the tolerance period according to the base clock signal and the tolerable frequency range and selecting the available turn-on time point or the lowest voltage time point which occurs within the tolerance period to be the decided time point to generate the operation clock signal includes: generating a high frequency clock signal and a low frequency clock signal according to the base clock signal, the tolerable frequency range and the PWM signal; and generating a tolerance period signal according to the high frequency clock signal and the low frequency clock signal, wherein the tolerance period signal is indicative of the tolerance period; wherein when the time point option signal and the tolerance period signal are both at an enable level, the operation clock signal is generated, or otherwise, the operation clock signal is generated at a rising time point of the low frequency clock signal.

In one embodiment, the step for deciding the tolerance period according to the base clock signal and the tolerable frequency range and selecting the available turn-on time point or the lowest voltage time point which occurs within the tolerance period to be the decided time point to generate the operation clock signal includes: detecting a rising edge of the low frequency clock signal, to decide the rising time point of the low frequency clock signal.

In one embodiment, the step for generating the lowest voltage time point signal according to the phase node voltage during the tolerance period includes: when being enabled by a tolerance period signal, sampling and holding a plurality of the phase node voltages during the tolerance period, to generate the time point option signal; and selecting a lowest phase node voltage among the plurality of the phase node voltages, to generate the lowest voltage time point signal, wherein the lowest voltage time point signal is indicative of the lowest voltage time point.

In one embodiment, the step for deciding the tolerance period according to the base clock signal and the tolerable frequency range and selecting the available turn-on time point or the lowest voltage time point which occurs within the tolerance period to be the decided time point to generate the operation clock signal includes: generating a high frequency clock signal and a low frequency clock signal according to the base clock signal, the tolerable frequency range and the PWM signal; generating a tolerance period signal according to the high frequency clock signal and the low frequency clock signal, wherein the tolerance period signal is indicative of the tolerance period; and generating the operation clock signal according to the lowest voltage time point signal and the low frequency clock signal.

Advantages of the present invention include: that the present invention can operate substantially in constant frequency to a certain degree, and that the present invention has an improved light load efficiency.

The objectives, technical details, features, and effects of the present invention will be better understood with regard to the detailed description of the embodiments below, with reference to the attached drawings.

BRIEF DESCRIPTION OF THE DRAWINGS

FIG. 3A to FIG. 3K show different types of power stage circuits that the present invention can be applied to.

FIG. 16 is a schematic diagram showing the light load efficiency versus load current of a switching regulator of the present invention and the light load efficiency versus load current of a conventional switching regulator.

FIG. 17 to FIG. 29 show flow chart diagrams of a control method of a switching regulator according to an embodiment of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention.

Figure 1:
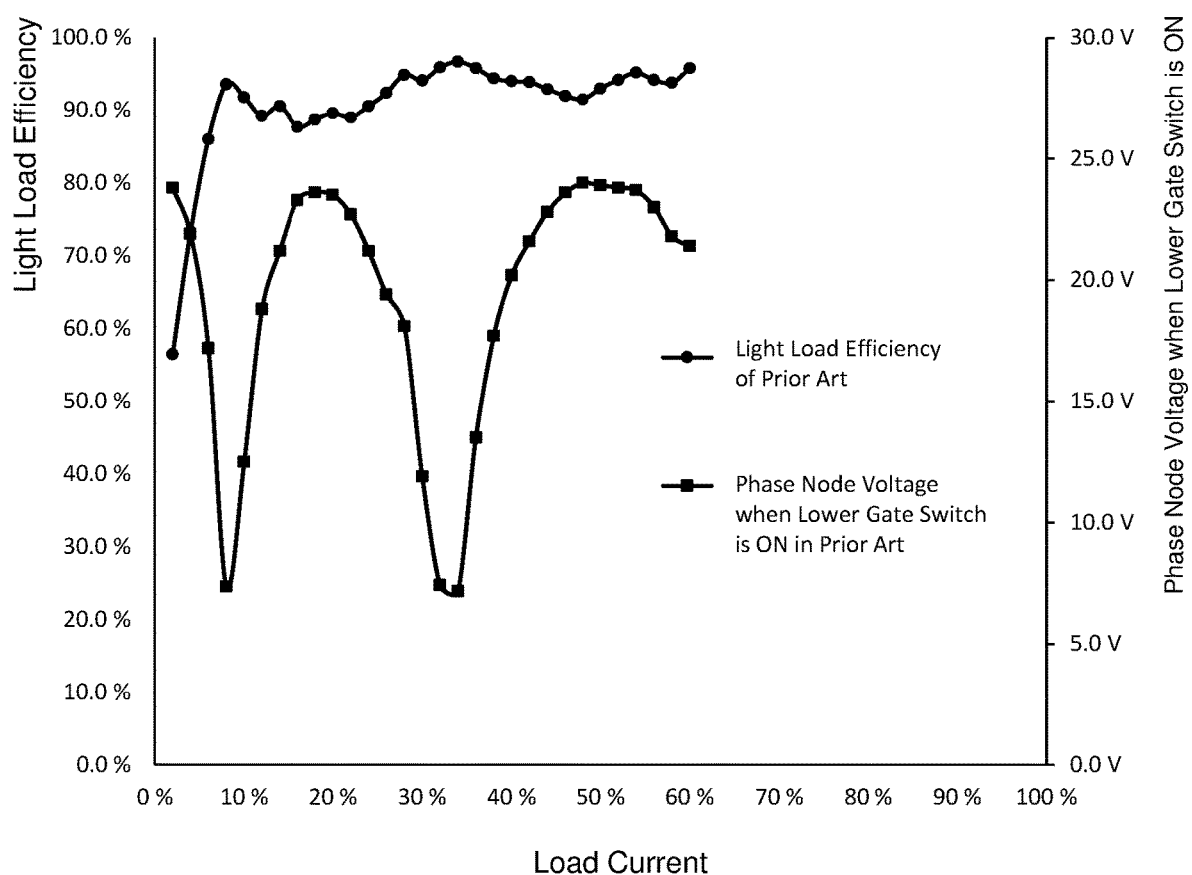
FIG. 1 is a diagram showing the light load efficiency and phase node voltage when the lower gate switch is ON in a conventional switching regulator.
Figure 2A:
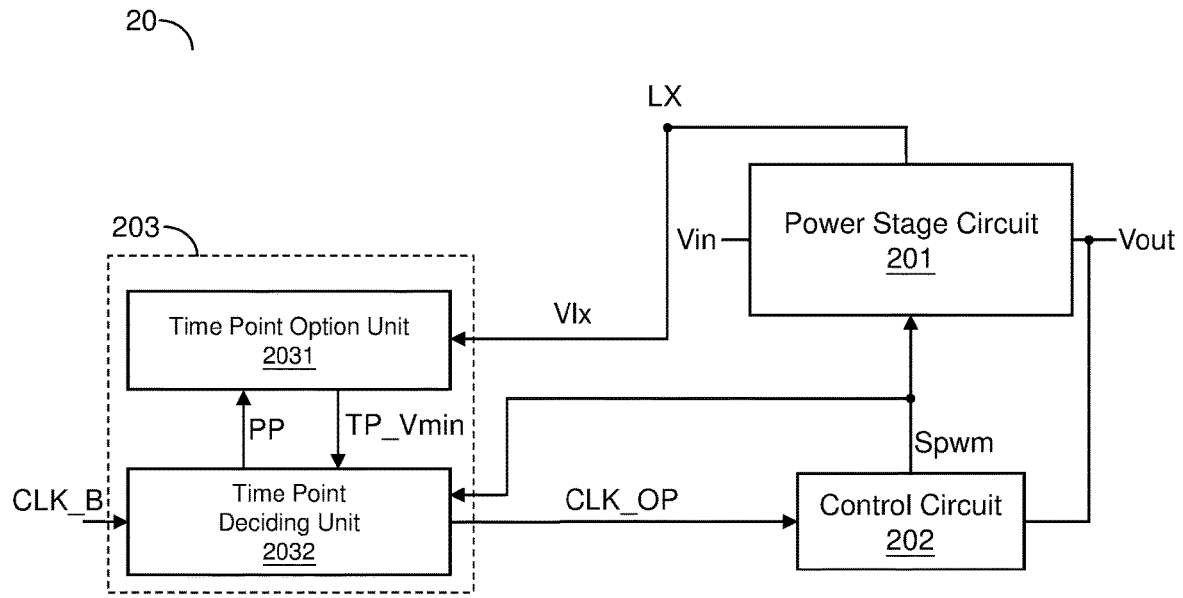
FIG. 2A shows a schematic circuit block diagram of a switching regulator according to an embodiment of the present invention.

Please refer to FIG. 2A, which shows a schematic circuit block diagram of a switching regulator according to an embodiment of the present invention. As shown in FIG. 2A, the switching regulator 20 of the present invention includes: a power stage circuit 201, a control circuit 202 and an operation clock signal generator circuit 203. The power stage circuit 201 is configured to operably switch at least one power switch therein (which will be shown later) according to a pulse width modulation (PWM) signal Spwm, to switch an inductor (which will be shown later) coupled to a phase node LX, thus converting an input voltage Vin to an output voltage Vout, wherein the phase node LX has a phase node voltage Vlx. In one embodiment, the aforementioned output voltage Vout is provided to a load circuit which requires to operate under a substantial constant frequency of the PWM signal Spwm (i.e., the operation frequency of the power switch), wherein such load circuit can be, for example but not limited to, a touch screen with a stylus. The control circuit 202 is configured to operably generate the PWM signal Spwm according to an operation clock signal CLK_OP. The operation clock signal generator circuit 203 is configured to operably generate the operation clock signal CLK_OP.

Figure 14:
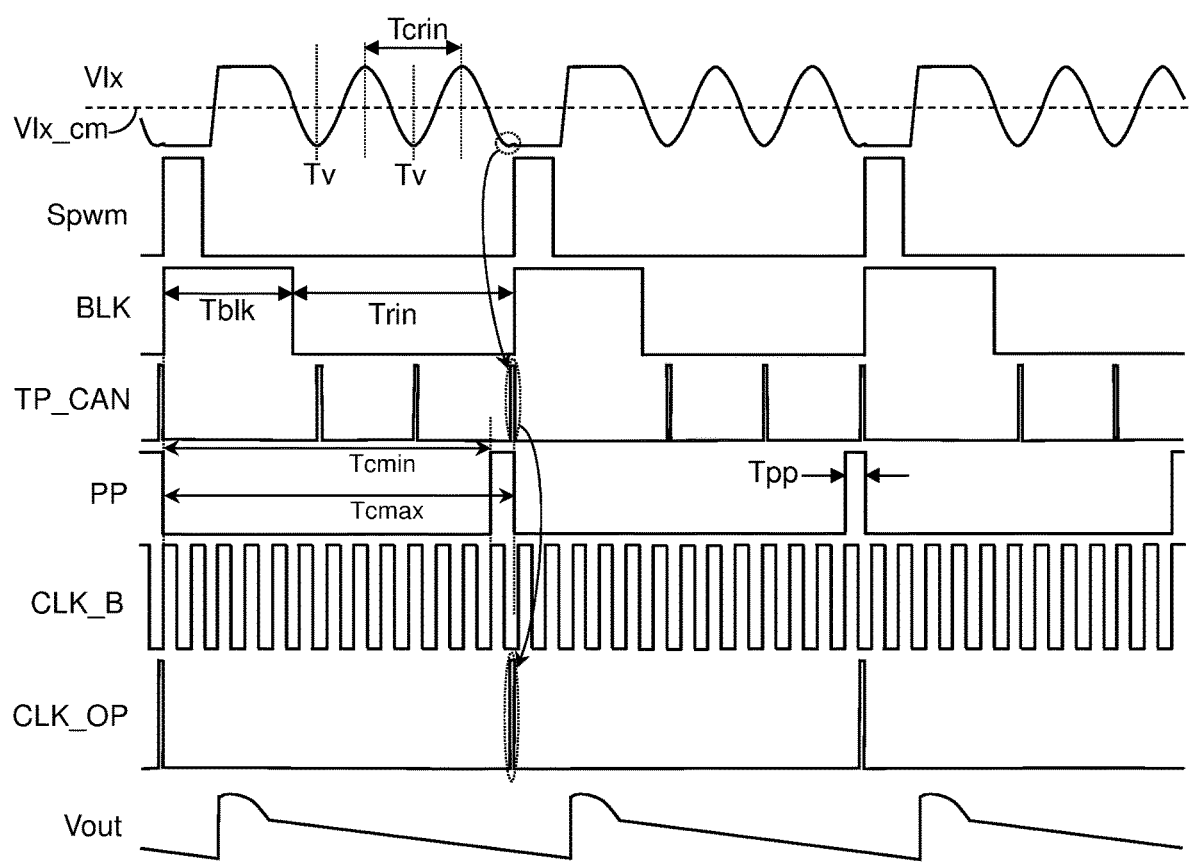
FIG. 14 illustrates a signal waveform diagram depicting relevant signals in a switching regulator according to an embodiment of the present invention.

Please refer to FIG. 2A in conjunction with FIG. 14. FIG. 14 illustrates a signal waveform diagram depicting relevant signals in a switching regulator according to an embodiment of the present invention. The operation clock signal generator circuit 203 includes: a time point option unit 2031 and a time point deciding unit 2032. The time point option unit 2031 is configured to operably generate a lowest voltage time point signal TP_Vmin according to the phase node voltage Vlx during a tolerance period Tpp, to indicate a lowest voltage time point at which the phase node voltage Vlx is at its lowest voltage during the tolerance period Tpp. The time point deciding unit 2032 is configured to operably decide the tolerance period Tpp according to a base clock signal CLK_B and a tolerable frequency range, and is configured to operably select the lowest voltage time point to be a decided time point according to the lowest voltage time point signal TP_Vmin, to generate the operation clock signal CLK_OP.

The decided time point is a time point which corresponds to when the phase node voltage Vlx is lowest within the tolerance period Tpp. The beginning time point of the tolerance period Tpp is a time point obtained by counting a shortest tolerance period Tcmin from a previous decided time point, wherein the shortest tolerance period Tcmin corresponds to a highest frequency of the tolerable frequency range. The ending time point of the tolerance period Tpp is a time point obtained by counting a longest tolerance period Tcmax from a previous decided time point, wherein the longest tolerance period Tcmax corresponds to a lowest frequency of the tolerable frequency range. It is worthwhile noting that, there is a ringing period Trin occurring during a dead time when the switching regulator 20 operates in a discontinuous conduction mode (DCM). When the switching regulator operates in DCM, when a load circuit powered by the output voltage Vout is in a light load condition and when the power switches in the power stage circuit 201 are all OFF, the phase node voltage Vlx will generate a ringing signal having a sinusoidal waveform. The ringing period Trin of the ringing signal is correlated with an inductance of the aforementioned inductor and an equivalent capacitance at the phase node LX.

Figure 2B:
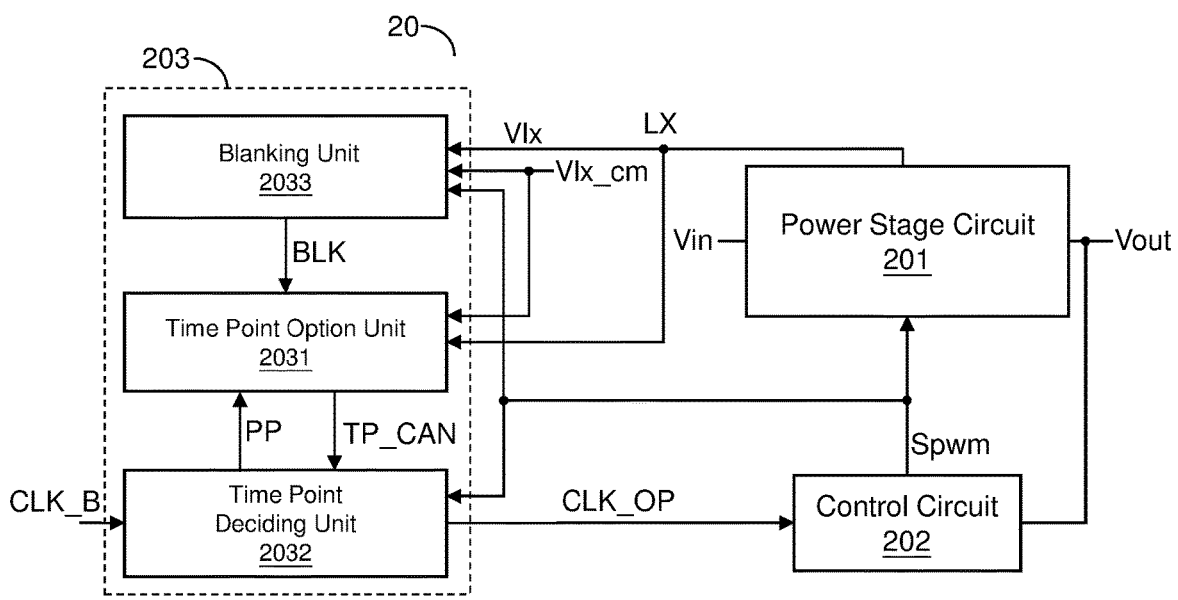
FIG. 2B shows a schematic circuit block diagram of a switching regulator according to another embodiment of the present invention.

Please refer to FIG. 2B, which shows a schematic circuit block diagram of a switching regulator according to another embodiment of the present invention. As shown in FIG. 2B, the switching regulator 20 of the present invention includes: a power stage circuit 201, a control circuit 202 and an operation clock signal generator circuit 203. The power stage circuit 201 is configured to operably switch at least one power switch (which will be shown later) according to a pulse width modulation (PWM) signal Spwm, to switch an inductor (which will be shown later) coupled to a phase node LX, thus converting an input voltage Vin to an output voltage Vout, wherein the phase node LX has a phase node voltage Vlx. In one embodiment, the aforementioned output voltage Vout is provided to a load circuit which requires to operate under a substantial constant frequency of the PWM signal Spwm (i.e., the operation frequency of the power switch), wherein such load circuit can be, for example but not limited to, a touch screen with a stylus. The control circuit 202 is configured to operably generate the PWM signal Spwm according to an operation clock signal CLK_OP. The operation clock signal generator circuit 203 is configured to operably generate the operation clock signal CLK_OP.

Please refer to FIG. 2B in conjunction with FIG. 14. The operation clock signal generator circuit 203 includes: a time point option unit 2031, a time point deciding unit 2032 and a blanking unit 2033. The time point option unit 2031 is configured to operably generate a time point option signal TP_CAN according to the phase node voltage Vlx of the phase node LX during a ringing period Trin subsequent to a blanking period Tblk, to indicate at least one available turn-on time point. The time point deciding unit 2032 is configured to operably decide the tolerance period Tpp according to a base clock signal CLK_B and a tolerable frequency range, and is configured to operably select an available turn-on time point occurring within the tolerance period Tpp to be a decided time point, to generate the operation clock signal CLK_OP.

In one embodiment, the available turn-on time point is within the tolerance period Tpp. Please refer to FIG. 2B along with FIG. 14. The blanking unit 2033 is configured to operably generate a blanking signal BLK which defines the blanking period Tblk. In one embodiment, the blanking unit 2033 is configured to operably decide a beginning time point of the blanking period Tblk according to the PWM signal Spwm. In one embodiment, the ending time point of the blanking period Tblk is decided by the blanking unit 2033 according to the phase node voltage Vlx, or by selecting a time point before the beginning time point of the tolerance period Tpp.

In one embodiment, the decided time point is a time point which corresponds to a lowest the phase node voltage Vlx within the tolerance period Tpp, or the decided time point is the ending time point of the tolerance period Tpp. Please refer to FIG. 14. In one embodiment, the beginning time point of the tolerance period Tpp a time point obtained by counting a shortest tolerance period Tcmin from a previous decided time point, wherein the shortest tolerance period Tcmin corresponds to a highest frequency of the tolerable frequency range. In one embodiment, the ending time point of the tolerance period Tpp is a time point obtaining by counting a longest tolerance period Tcmax from a previous decided time point, wherein the longest tolerance period Tcmax corresponds to a lowest frequency of the tolerable frequency range. As described above, there is a ringing period Trin occurring during the dead time when the switching regulator 20 operates in a discontinuous conduction mode (DCM).

Please refer to FIG. 14. In one embodiment, the available turn-on time point is correlated with a valley time point Tv of the ringing signal of the phase node voltage Vlx during the ringing period Trin. In one embodiment, the power stage circuit 201 includes a boost power stage circuit, and the output voltage Vout of boost power stage circuit is not lower than 2-fold of the input voltage Vin of the boost power stage circuit. Please refer to FIG. 14 along with FIG. 2C and FIG. 2D. The ringing period Trin of the ringing signal of the phase node voltage Vlx is correlated with an inductance of the inductor L and an equivalent capacitance at the phase node LX.

Figure 2C:
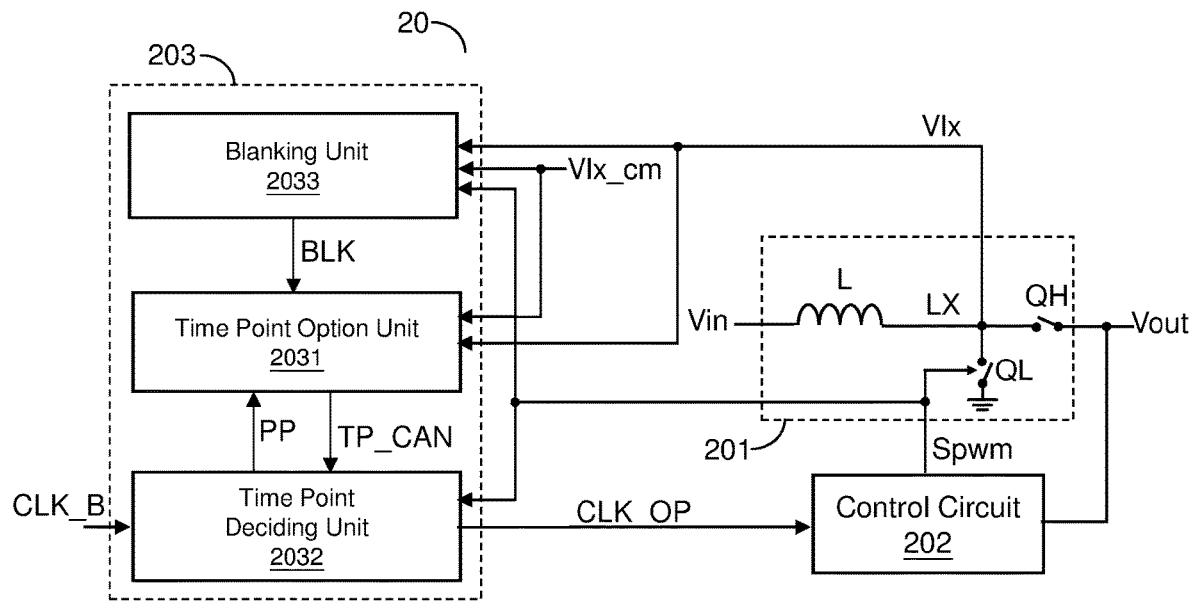
FIG. 2C shows a schematic circuit block diagram of a switching regulator according to yet another embodiment of the present invention.

FIG. 2C shows a schematic circuit block diagram of a switching regulator according to yet another embodiment of the present invention. The power stage circuit 201 of this embodiment is a boost power stage circuit. As shown in FIG. 2C, in one embodiment, the power stage circuit 201 includes: an inductor L and at least one power switch. The at least one power switch includes: an upper gate switch QH and a lower gate switch QL. The upper gate switch QH is coupled between the output voltage Vout and a phase node LX, whereas, the lower gate switch QL is coupled between phase node LX and a ground potential. The inductor L has its one end coupled to the input voltage Vin and its another end coupled to the phase node LX. In one embodiment, the upper gate switch QH can be replaced by an upper gate diode. In one embodiment, the lower gate switch QL can be replaced by a lower gate diode.

Figure 2D:
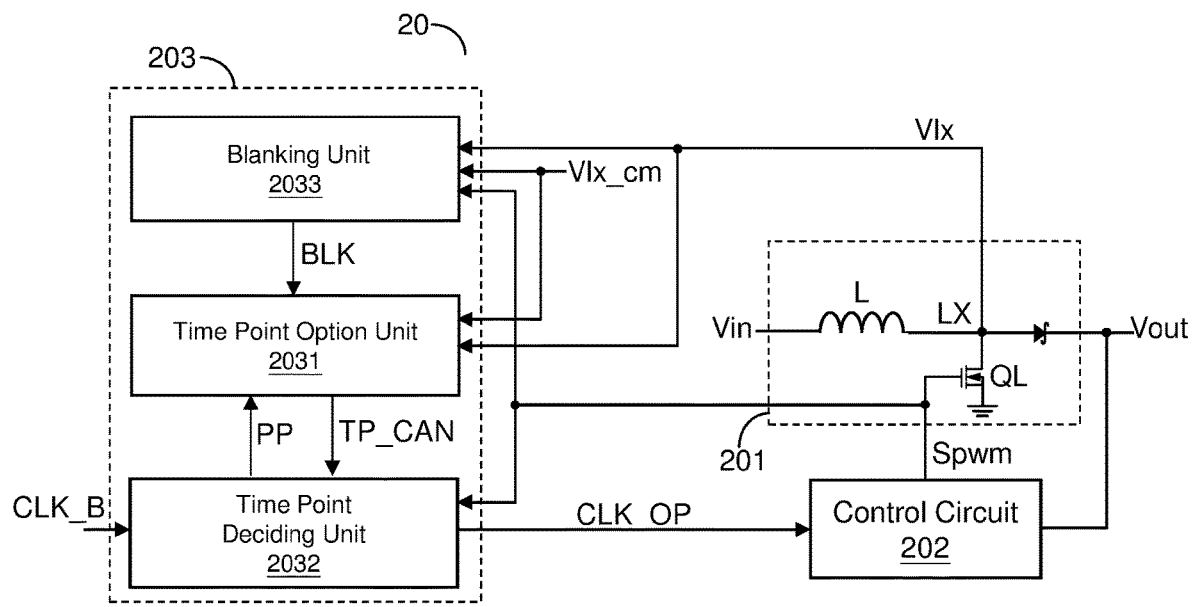
FIG. 2D shows a schematic circuit block diagram of a switching regulator according to still another embodiment of the present invention.
Figure 3G:
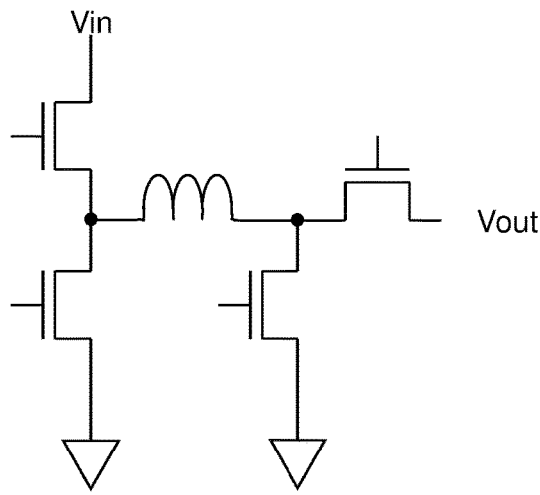
Figure 3H:
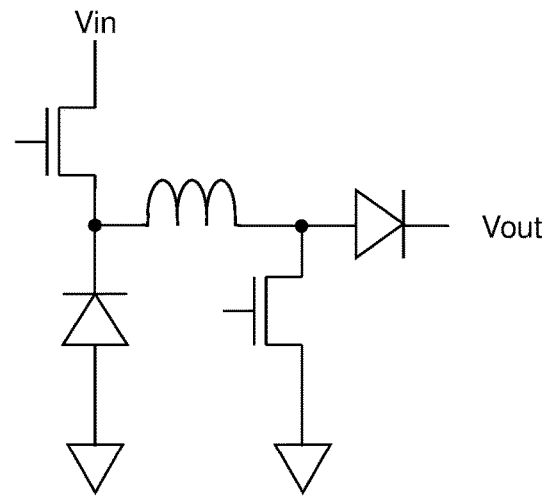
Figure 3I:
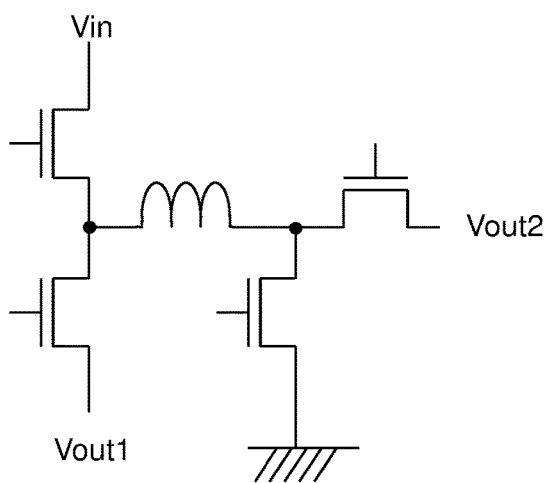
Figure 3J:
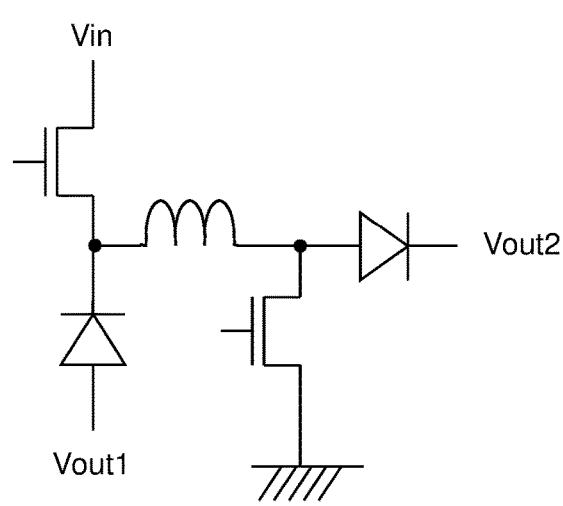
Figure 3K:
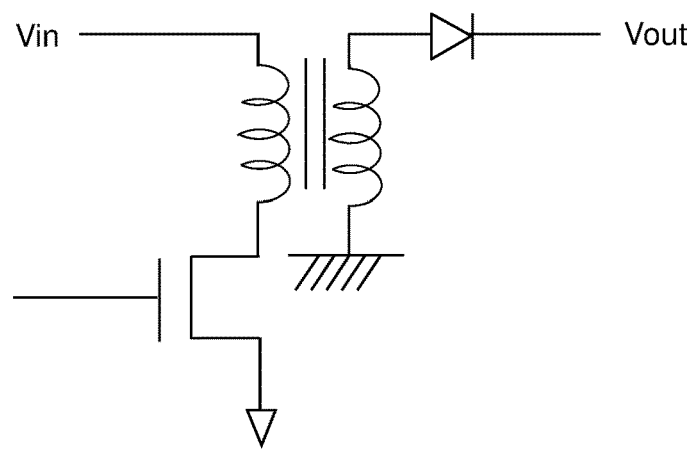

FIG. 2D shows a schematic circuit block diagram of a switching regulator according to still another embodiment of the present invention. The switching regulator of this embodiment shown in FIG. 2C is similar to the switching regulator of the embodiment shown in FIG. 2B, but is different in that: the upper gate switch of this embodiment is a Schottky diode, whereas, a lower gate switch QL is a Metal-Oxide-Semiconductor Field-Effect Transistor (MOSFET).

FIG. 3A to FIG. 3K show several embodiments of a switching regulator that the present invention is applicable to. The power stage circuit 201 of FIG. 2A can be implemented as any one of the power stage circuit topologies shown in FIG. 3A to FIG. 3K, wherein FIG. 3A to FIG. 3K show synchronous and asynchronous buck, boost, buck-boost, inverting buck-boost and flyback power stage circuits, respectively.

Figure 4:
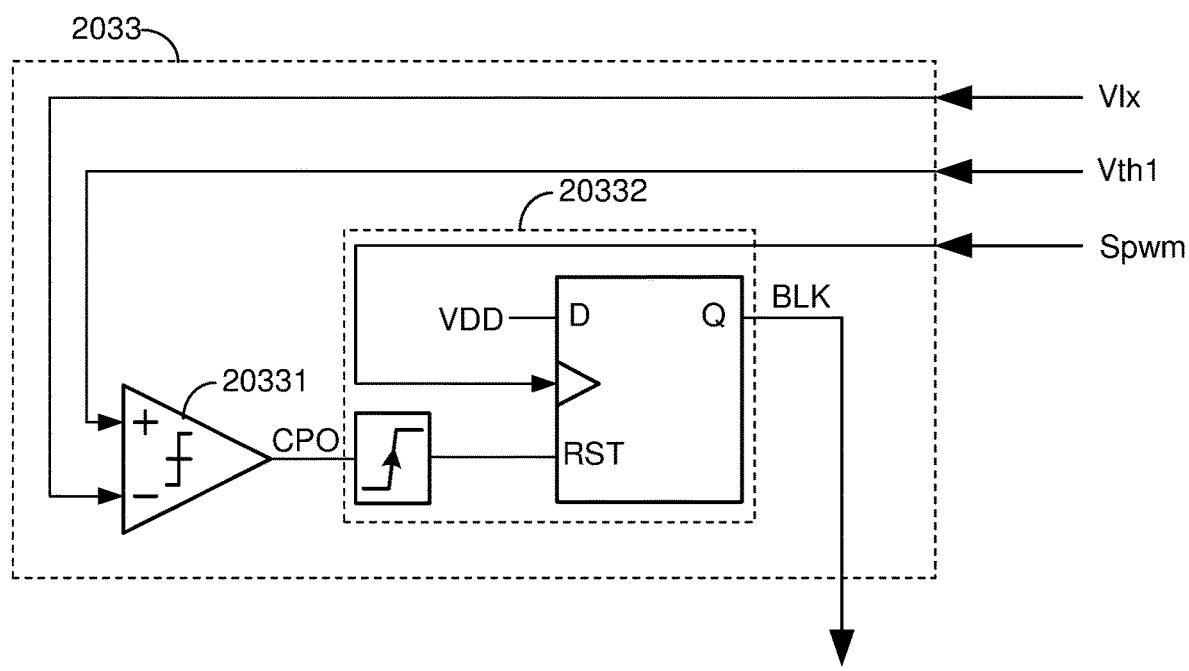
FIG. 4 shows a schematic circuit diagram of a blanking unit in a switching regulator according to an embodiment of the present invention.

FIG. 4 shows a schematic circuit diagram of a blanking unit in a switching regulator according to an embodiment of the present invention. As shown in FIG. 4, the blanking unit 2033 includes: a comparison circuit 20331 and a logic circuit 20332. The comparison circuit 20331 is configured to operably compare the phase node voltage Vlx with a first voltage threshold Vth1, to generate a comparison result CPO. In one embodiment, the first voltage threshold Vth1 includes: a common mode voltage Vlx_cm or a knee voltage of the phase node voltage Vlx. In one embodiment, in a case when the power stage circuit 201 is a boost power stage circuit, the common mode voltage Vlx_cm of the phase node voltage Vlx includes the input voltage Vin. The logic circuit 20332 is configured to operably decide the ending time point of the blanking period Tblk according to the comparison result CPO and is configured to operably decide the beginning time point of the blanking period Tblk according to the PWM signal Spwm, so as to generate the blanking signal BLK. In one embodiment, the logic circuit 20332 includes: an edge detector and a flip-flop.

It is worthwhile noting that, different types of power stage circuits have different types of common mode voltages Vlx_cm of the phase node voltage Vlx. As exemplified by the embodiment shown in FIG. 4, in a case when the power stage circuit is a boost power stage circuit, the common mode voltage Vlx_cm of the phase node voltage Vlx includes the input voltage Vin, whereas, in a case when the power stage circuit is a buck power stage circuit, the common mode voltage Vlx_cm of the phase node voltage Vlx includes the output voltage Vout, whereas, in a case when the power stage circuit is a buck-boost power stage circuit, the common mode voltage Vlx_cm of the phase node voltage Vlx includes a ground potential. That the common mode voltage Vlx_cm includes the "input voltage Vin" or "output voltage Vout" refers to the voltage level of the input voltage Vin or output voltage Vout in steady state.

Figure 5:
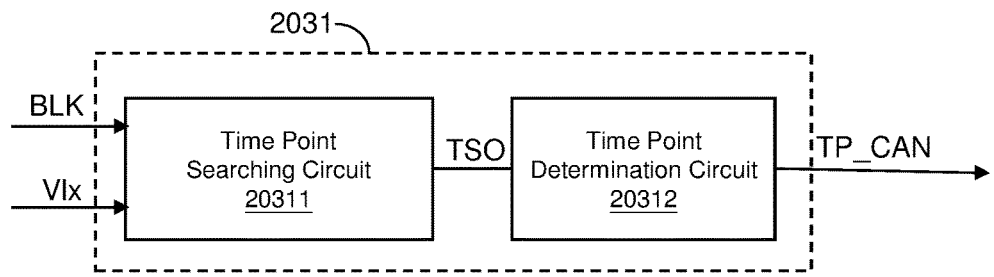
FIG. 5 shows a schematic block diagram of a time point option unit in a switching regulator according to an embodiment of the present invention.

FIG. 5 shows a schematic block diagram of a time point option unit in a switching regulator according to an embodiment of the present invention. As shown in FIG. 5 and FIG. 14, in a case when the time point option unit 2031 is configured to operably generate a time point option signal TP_CAN according to a phase node voltage Vlx of the phase node LX during a ringing period Trin subsequent to a blanking period Tblk, the time point option unit 2031 includes: a time point searching circuit 20311 and a time point determination circuit 20312. The time point searching circuit 20311 is configured to operably generate a time point searching result TSO according to the blanking signal BLK and the phase node voltage Vlx, wherein the time point searching result TSO indicates an occurrence time point of at least one valley or at least one peak of the phase node voltage Vlx within the ringing period Trin. The time point determination circuit 20312 is configured to operably decide whether each of the occurrence time point of the at least one valley or the at least one peak in the time point searching result TSO is an available turn-on time point, to decide at least one available turn-on time point, thereby generating the time point option signal TP_CAN.

In one embodiment, the time point determination circuit 20312 is configured to operably decide whether each of the occurrence time point of the at least one valley or the at least one peak in the time point searching result TSO is the available turn-on time point according to whether the phase node voltage Vlx corresponding to each of the occurrence time point of the at least one valley or the at least one peak in the time point searching result TSO is lower than a second voltage threshold. For example, when the phase node voltage Vlx corresponding to an occurrence time point of a valley or a peak in the time point searching result TSO is lower than a second voltage threshold (which is, for example but not limited to, the common mode voltage Vlx_cm of the phase node voltage Vlx), the time point determination circuit 20312 decides that this occurrence time point of the valley or the peak in the time point searching result TSO is an available turn-on time point. In another embodiment, the time point determination circuit 20312 is configured to operably count a sequence order of each of the occurrence time point of the at least one valley or the at least one peak in the time point searching result TSO, so as to decide whether each of the occurrence time point of the at least one valley or the at least one peak in the time point searching result TSO is an available turn-on time point. For example, when an occurrence time point of a certain valley or a certain peak is an odd numbered valley or an odd numbered peak, the time point determination circuit 20312 decides that the occurrence time point of this valley or this peak is an available turn-on time point. In one embodiment, the time point searching circuit 20311 is disabled at the beginning time point of the blanking signal BLK, whereas, the time point searching circuit 20311 is enabled at the ending time point of the blanking signal BLK.

Figure 6A:
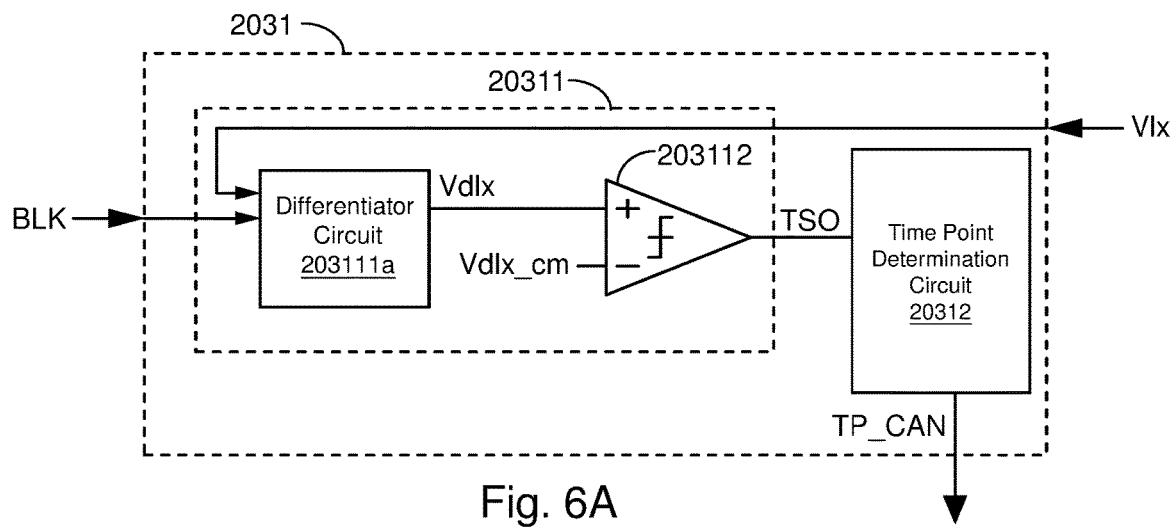
FIG. 6A shows a schematic circuit block diagram of a time point option unit in a switching regulator according to an embodiment of the present invention.

FIG. 6A shows a schematic circuit block diagram of a time point option unit in a switching regulator according to an embodiment of the present invention. In one embodiment, as shown in FIG. 6A, the time point searching circuit 20311 includes: a differentiator circuit 203111a and a comparison circuit 203112. The differentiator circuit 203111a is configured to operably execute a differentiation operation on the phase node voltage Vlx, to generate a differentiation signal Vdlx. The comparison circuit 203112 is configured to operably compare the differentiation signal Vdlx with a common mode signal Vdlx_cm of the differentiation signal Vdlx, to generate the time point searching result TSO. The time point determination circuit 20312 of this embodiment shown in FIG. 6A is similar to the time point determination circuit 20312 of the embodiment shown in FIG. 5, so the details thereof are not redundantly explained here.

Figure 6B:
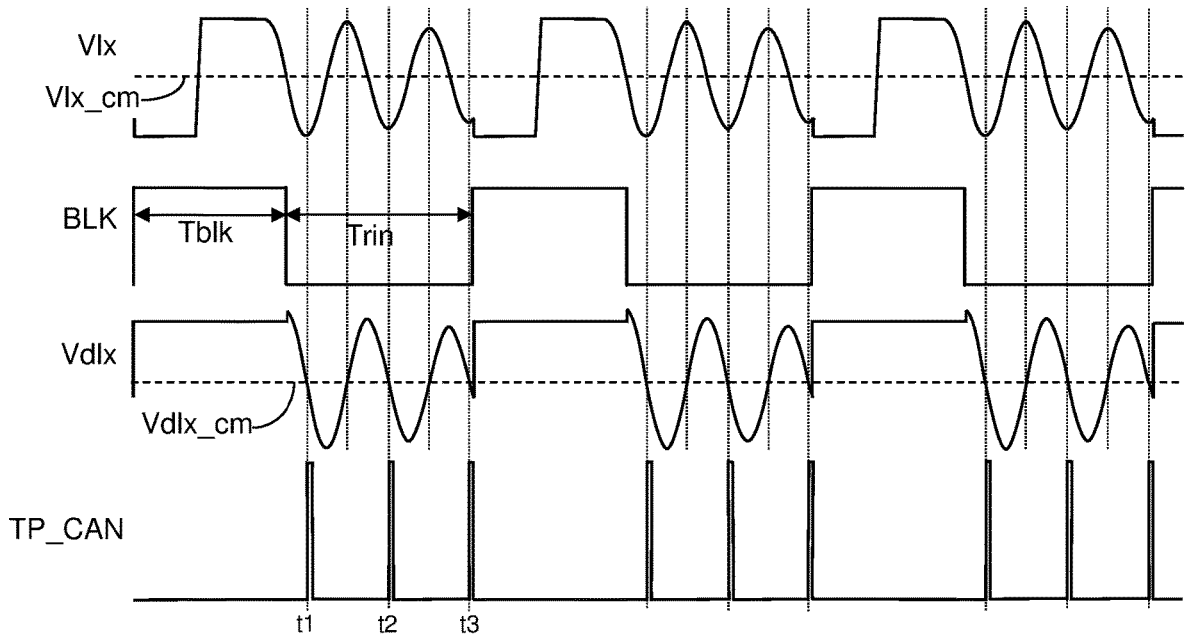
FIG. 6B illustrates a signal waveform diagram depicting relevant signals within a time point option unit of FIG. 6A according to an embodiment of the present invention.

FIG. 6B illustrates a signal waveform diagram depicting relevant signals within a time point option unit of FIG. 6A according to an embodiment of the present invention. The phase node voltage Vlx, the common mode voltage Vlx_cm of the phase node voltage Vlx, the blanking signal BLK, the differentiation signal Vdlx, the common mode signal Vdlx_cm of the differentiation signal Vdlx and the time point option signal TP_CAN are illustrated in FIG. 6B. As shown in FIG. 6B, at time point t1, time point t2 and time point t3, the differentiation signal Vdlx is zero and in the meantime the phase node voltages Vlx corresponding to the differentiation signal Vdlx at these time points are lower than a second voltage threshold (which is, for example but not limited to, the common mode voltage Vlx_cm of the phase node voltage Vlx). Or, alternatively, at time point t1, time point t2 and time point t3, the differentiation signal Vdlx is at an occurrence time point of a first valley or peak, a third valley or peak, and a fifth valley or peak, respectively (i.e., at time point t1, time point t2 and time point t3, the differentiation signal Vdlx is at an occurrence time point of an odd numbered valley or peak, wherein valleys and peaks are both counted). Thus, the time point t1, the time point t2 and the time point t3 are all available turn-on time points.

Figure 7A:
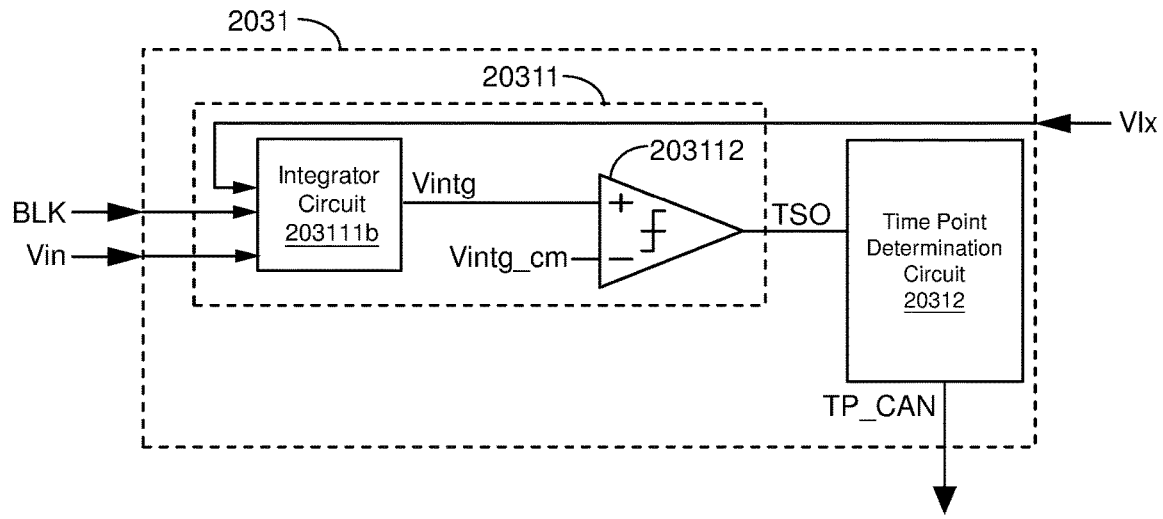
FIG. 7A shows a schematic circuit block diagram of a time point option unit in a switching regulator according to another embodiment of the present invention.

FIG. 7A shows a schematic circuit block diagram of a time point option unit in a switching regulator according to another embodiment of the present invention. As shown in FIG. 7A, in one embodiment, the time point searching circuit 20311 includes: an integrator circuit 203111b and a comparison circuit 203112. The integrator circuit 203111b is configured to operably execute an integration operation on the phase node voltage Vlx, to generate an integration signal Vintg. The comparison circuit 203112 is configured to operably compare the integration signal Vintg with a common mode signal Vintg_cm of the integration signal Vintg, to generate the time point searching result TSO. In one embodiment, the common mode signal Vintg_cm of the integration signal Vintg includes the input voltage Vin. The time point determination circuit 20312 of this embodiment shown in FIG. 7A is similar to the time point determination circuit 20312 of the embodiment shown in FIG. 5, so the details thereof are not redundantly explained here.

Figure 7B:
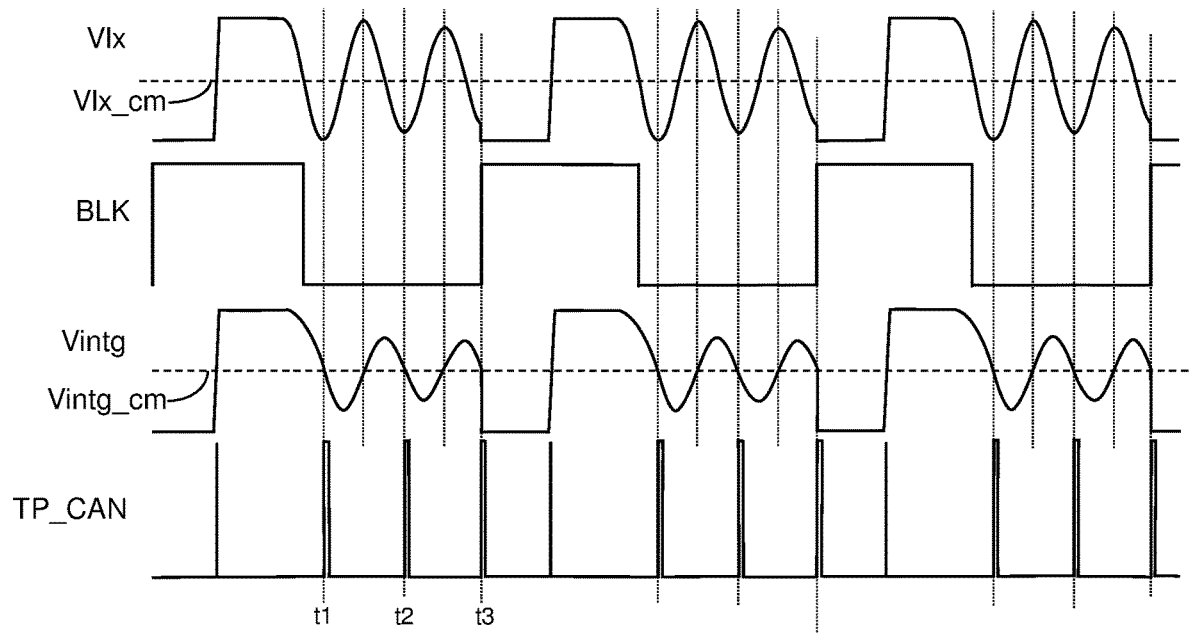
FIG. 7B illustrates a signal waveform diagram depicting relevant signals within a time point option unit of FIG. 7A according to an embodiment of the present invention.

FIG. 7B illustrates a signal waveform diagram depicting relevant signals within a time point option unit of FIG. 7A according to an embodiment of the present invention. The phase node voltage Vlx, the common mode voltage Vlx_cm of the phase node voltage Vlx, the blanking signal BLK, an integration signal Vintg, the common mode signal Vintg_cm of the integration signal Vintg and the time point option signal TP_CAN are illustrated in FIG. 7B. As shown in FIG. 7B, at time point t1, time point t2 and time point t3, the integration signal Vintg is zero and in the meantime the phase node voltages Vlx corresponding to the integration signals Vintg at these time points are lower than a second voltage threshold (which is, for example but not limited to, the common mode voltage Vlx_cm of the phase node voltage Vlx). Or, alternatively, at time point t1, time point t2 and time point t3, the integration signals Vintg are at an occurrence time point of a first valley or peak, a third valley or peak, and a fifth valley or peak, respectively (i.e., at time point t1, time point t2 and time point t3, the integration signal Vintg is at an occurrence time point of an odd numbered valley or peak, wherein valleys and peaks are both counted). Thus, the time point t1, the time point t2 and the time point t3 are all available turn-on time points.

Figure 8:
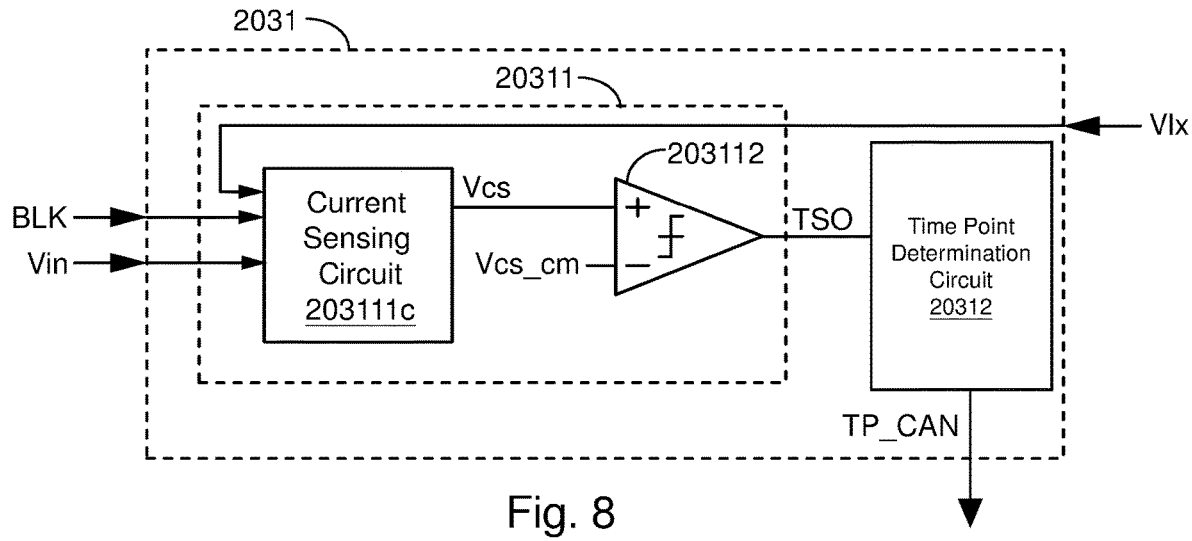
FIG. 8 shows a schematic circuit block diagram of a time point option unit in a switching regulator according to yet another embodiment of the present invention.

FIG. 8 shows a schematic circuit block diagram of a time point option unit in a switching regulator according to yet another embodiment of the present invention. As shown in FIG. 8, in one embodiment, the time point searching circuit 20311 includes: a current sensing circuit 203111c and a comparison circuit 203112. The current sensing circuit 203111c is configured to operably sense a current flowing through the phase node LX, to generate a current signal Vcs. The comparison circuit 203112 is configured to operably compare the current signal Vcs with a common mode signal Vcs_cm of the current signal Vcs, to generate the time point searching result TSO. In one embodiment, the common mode signal Vcs_cm of the current signal Vcs includes the input voltage Vin. The time point determination circuit 20312 of this embodiment shown in FIG. 8 is similar to the time point determination circuit 20312 of the embodiment shown in FIG. 5, so the details thereof are not redundantly explained here.

Figure 9:
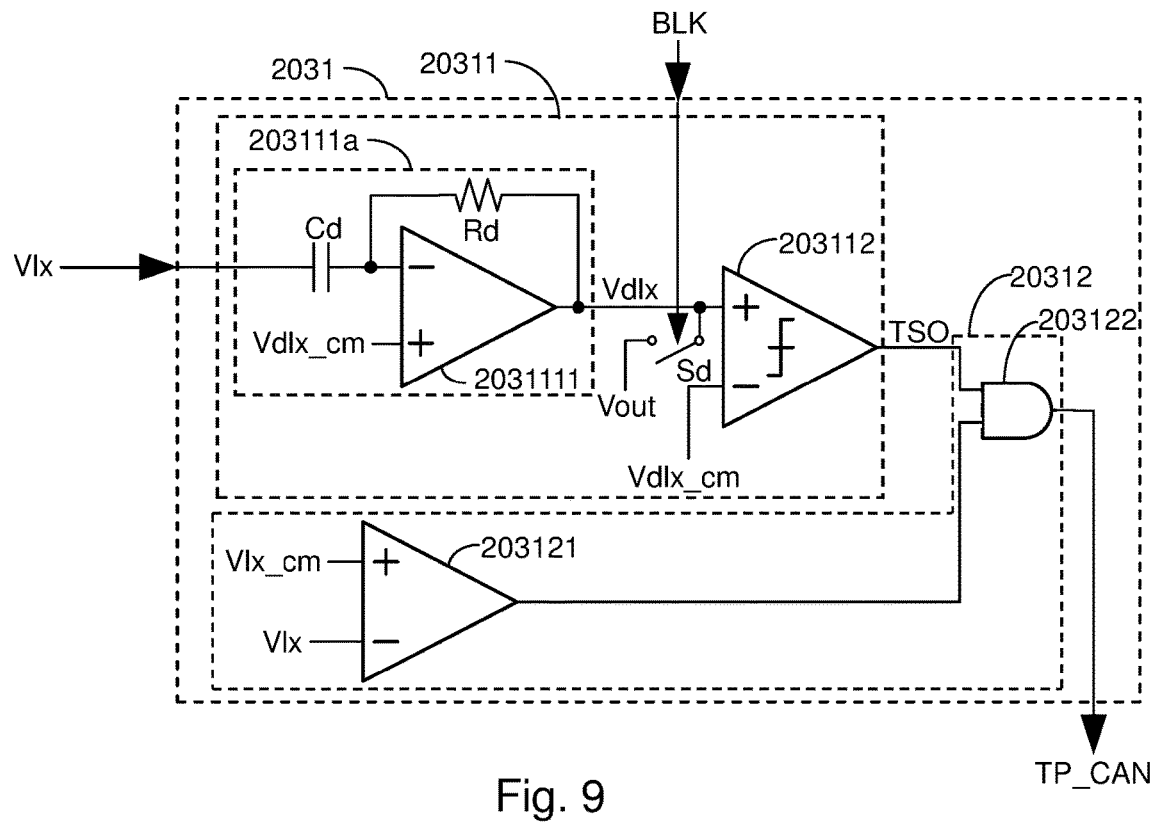
FIG. 9 shows a schematic circuit diagram of a time point option unit in a switching regulator according to still another embodiment of the present invention.

FIG. 9 shows a schematic circuit diagram of a time point option unit in a switching regulator according to still another embodiment of the present invention. The comparison circuit 203112 of this embodiment shown in FIG. 9 is similar to the comparison circuit 203112 of the embodiment shown in FIG. 6A, so the details thereof are not redundantly explained here. The differentiator circuit 203111a of this embodiment shown in FIG. 9 is an exemplary embodiment of the differentiator circuit 203111a shown in FIG. 6A. As shown in FIG. 9, in one embodiment, the differentiator circuit 203111a includes: an error amplifier 2031111, a resistor Rd and a capacitor Cd. The capacitor Cd has one end coupled to a negative input end of the error amplifier 2031111 and has another end coupled to the phase node voltage Vlx. The resistor Rd has one end coupled to an output end of the error amplifier 2031111 and has another end coupled to the negative input end of the error amplifier 2031111. The error amplifier 2031111 has its positive input end coupled to the common mode signal Vdlx_cm of the differentiation signal Vdlx.

The time point determination circuit 20312 of this embodiment shown in FIG. 9 is an exemplary embodiment of the time point determination circuit 20312 shown in FIG. 6A. In one embodiment, the time point determination circuit 20312 includes: a comparison circuit 203121 and an AND gate 203122. When the phase node voltage Vlx is smaller than the common mode voltage Vlx_cm of the phase node voltage Vlx and when the time point searching result TSO is at an enable level, the time point option signal TP_CAN is switched to an enable level. When the blanking signal BLK is switched to an enable level, the positive input end of the comparison circuit 203121 is coupled to the output voltage Vout via a switch Sd, so as to implement the blanking period Tblk.

Figure 10:
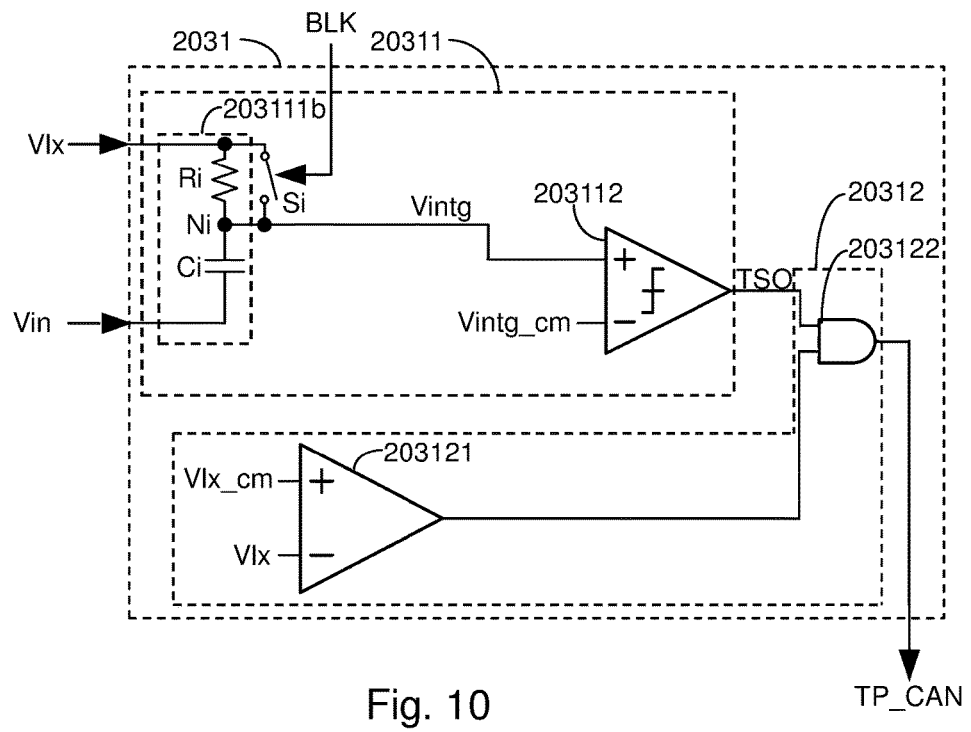
FIG. 10 shows a schematic circuit diagram of a time point option unit in a switching regulator according to still another embodiment of the present invention.

FIG. 10 shows a schematic circuit diagram of a time point option unit in a switching regulator according to still another embodiment of the present invention. The comparison circuit 203112 of this embodiment shown in FIG. 10 is similar to the comparison circuit 203112 of the embodiment shown in FIG. 7A, so the details thereof are not redundantly explained here. The time point determination circuit 20312 of this embodiment shown in FIG. 10 is similar to the time point determination circuit 20312 of the embodiment shown in FIG. 9, so the details thereof are not redundantly explained here. The integrator circuit 203111b of this embodiment shown in FIG. 10 is an exemplary embodiment of the integrator circuit 203111b shown in FIG. 7A. As shown in FIG. 10, in one embodiment, the integrator circuit 203111b includes: a resistor Ri and a capacitor Ci. The resistor Ri and the capacitor Ci are connected in series between the phase node voltage Vlx and the input voltage Vin. A node Ni between the resistor Ri and the capacitor Ci is coupled to the positive input end of the comparison circuit 203112. In one embodiment, the node Ni is coupled to the phase node voltage Vlx via a switch Si or the node Ni is coupled to a voltage higher than phase node voltage Vlx. When the blanking signal BLK is switched to an enable level, the node Ni is coupled to the phase node voltage Vlx via the switch Si or the node Ni is coupled to the voltage higher than phase node voltage Vlx, so as to implement the blanking period Tblk.

Figure 11:
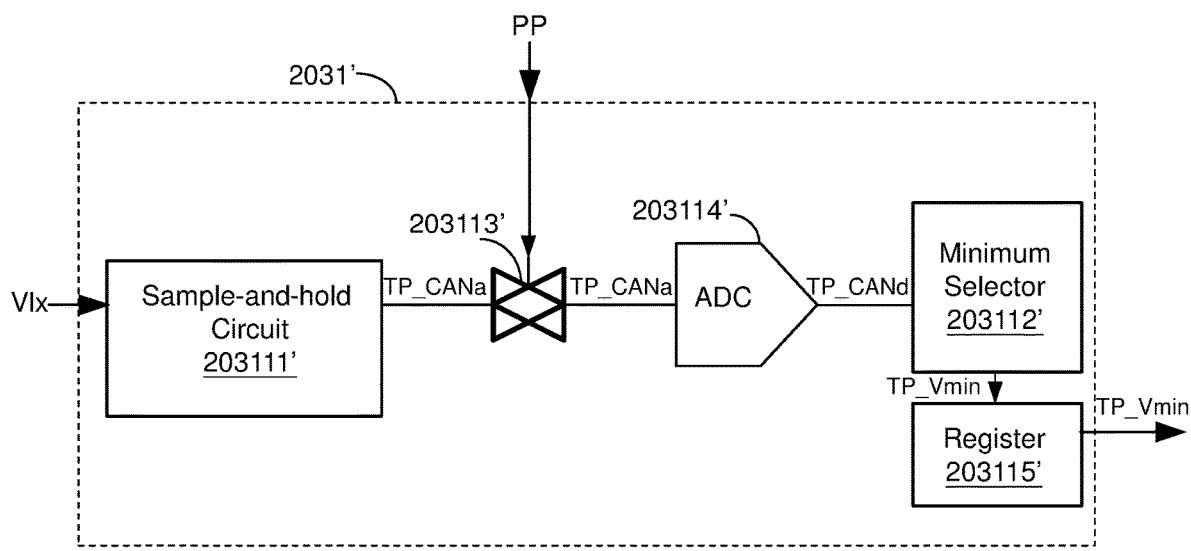
FIG. 11 shows a schematic circuit block diagram of a time point option unit in a switching regulator according to still another embodiment of the present invention.

FIG. 11 shows a schematic circuit block diagram of a time point option unit in a switching regulator according to still another embodiment of the present invention. Please refer to FIG. 11 along with FIG. 14. In a case when the time point option unit 2031' is configured to operably generate a lowest voltage time point signal TP_Vmin during the tolerance period Tpp, the time point option unit 2031' includes: a sample-and-hold circuit 203111', a lowest value selector 203112', a transmission gate 203113', an analog-to-digital converter (ADC) 203114' and a register 203115'. The sample-and-hold circuit 203111' is enabled by a tolerance period signal PP and is configured to operably sample and hold the phase node voltage Vlx during the tolerance period Tpp, to generate an analog time point option signal TP_CANa. The thus generated analog time point option signal TP_CANa is delivered to the ADC 203114' via the transmission gate 203113'. The ADC 203114' performs analog-to-digital conversion on the analog time point option signal TP_CANa, to generate a digital time point option signal TP_CANd. The lowest value selector 203112' is coupled to the sample-and-hold circuit 203111', wherein the lowest value selector 203112' is configured to operably select a lowest phase node voltage Vlx among the sampled phase node voltages Vlx, to generate the lowest voltage time point signal TP_Vmin which is stored in the register 203115', wherein the lowest voltage time point signal TP_Vmin is indicative of the lowest voltage time point.

Figure 12:
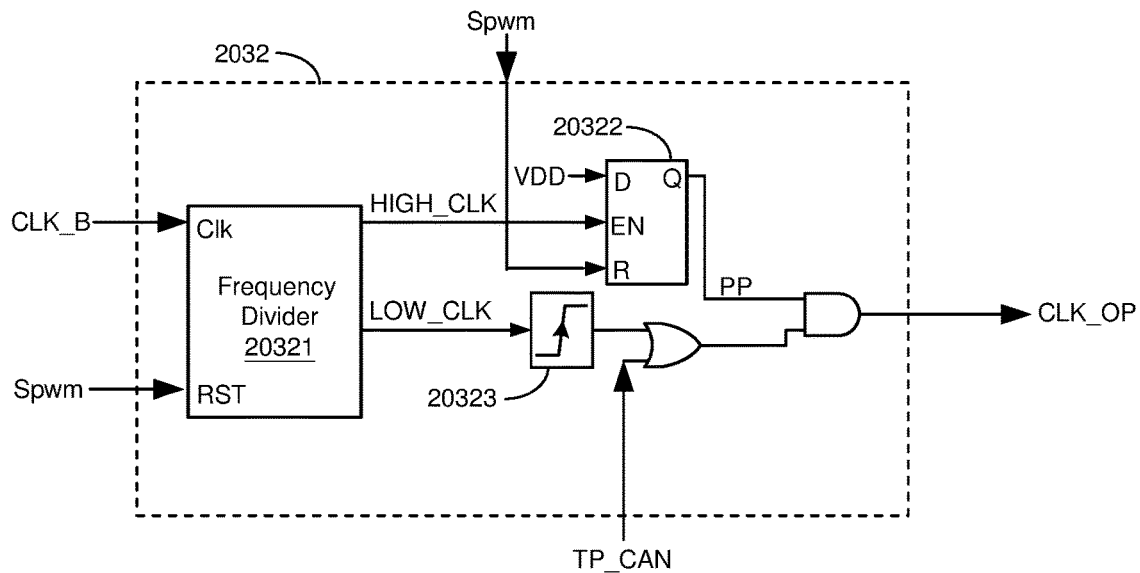
FIG. 12 shows a schematic circuit diagram of a time point deciding unit in a switching regulator according to an embodiment of the present invention.

FIG. 12 shows a schematic circuit block diagram of a time point deciding unit in a switching regulator according to an embodiment of the present invention. As shown in FIG. 12, the time point deciding unit 2032 includes: a frequency divider 20321 and a tolerance period generation circuit 20322. The frequency divider 20321 is configured to operably generate a high frequency clock signal HIGH_CLK and a low frequency clock signal LOW_CLK according to a base clock signal CLK_B, a tolerable frequency range and the PWM signal Spwm. The tolerance period generation circuit 20322 is configured to operably generate a tolerance period signal PP according to the high frequency clock signal HIGH_CLK and a PWM signal Spwm, wherein the tolerance period signal PP is indicative of the tolerance period Tpp. When the time point option signal TP_CAN and the tolerance period signal PP are both at an enable level, the operation clock signal CLK_OP is generated, or otherwise, the operation clock signal CLK_OP is generated at a rising time point of the low frequency clock signal LOW_CLK. In one embodiment, the time point deciding unit 2032 further includes: an edge detection circuit 20323, which is configured to operably detect a rising edge of the low frequency clock signal LOW_CLK, to decide the rising time point of the low frequency clock signal LOW_CLK.

Figure 13:
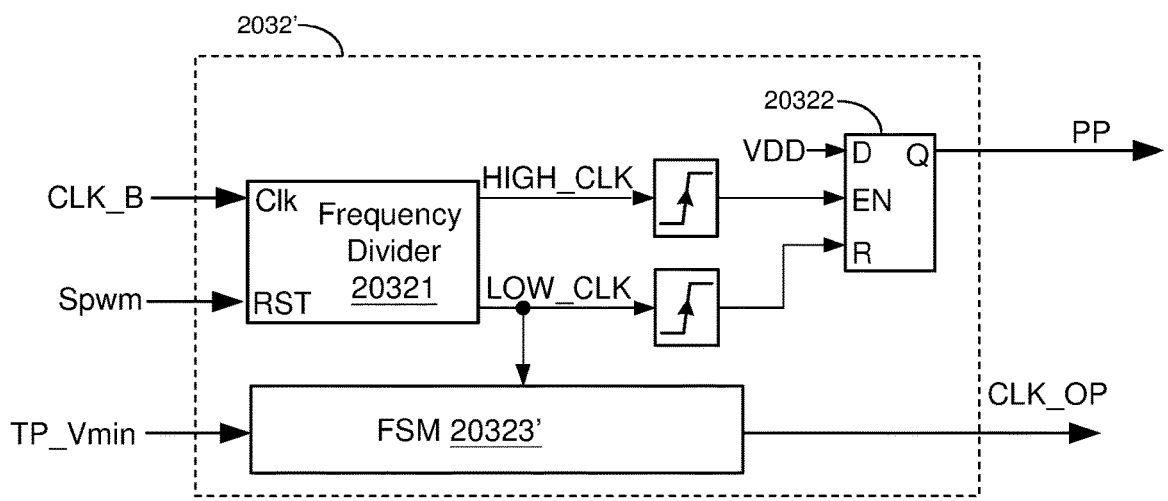
FIG. 13 shows a schematic circuit block diagram of a time point deciding unit in a switching regulator according to another embodiment of the present invention.

FIG. 13 shows a schematic circuit block diagram of a time point deciding unit in a switching regulator according to another embodiment of the present invention. As shown in FIG. 13, the time point deciding unit 2032' includes: a frequency divider 20321, a tolerance period generation circuit 20322 and a finite-state machine (FSM) 20323'. The frequency divider 20321 is configured to operably generate a high frequency clock signal HIGH_CLK and a low frequency clock signal LOW_CLK according to a base clock signal CLK_B, a tolerable frequency range and a PWM signal Spwm. The tolerance period generation circuit 20322 is configured to operably generate a tolerance period signal PP according to the high frequency clock signal HIGH_CLK and the PWM signal Spwm, wherein the tolerance period signal PP is indicative of the tolerance period Tpp. The FSM 20323' is configured to operably generate the operation clock signal CLK_OP according to the lowest voltage time point signal TP_Vmin and the low frequency clock signal LOW_CLK. The time point deciding unit 2032' of this embodiment is implemented in cooperation with the time point option unit 2031' of FIG. 11.

FIG. 14 illustrates a signal waveform diagram depicting relevant signals in a switching regulator according to an embodiment of the present invention. The phase node voltage Vlx, the common mode voltage Vlx_cm of the phase node voltage Vlx, the PWM signal Spwm, the blanking signal BLK, the time point option signal TP_CAN, the tolerance period signal PP, the base clock signal CLK_B, the operation clock signal CLK_OP and the output voltage Vout are illustrated in FIG. 14. As shown in FIG. 14, when a lowest voltage time point or an available turn-on time point falls within the tolerance period Tpp, the operation clock signal CLK_OP is generated at the lowest voltage time point or the available turn-on time point.

Figure 15:
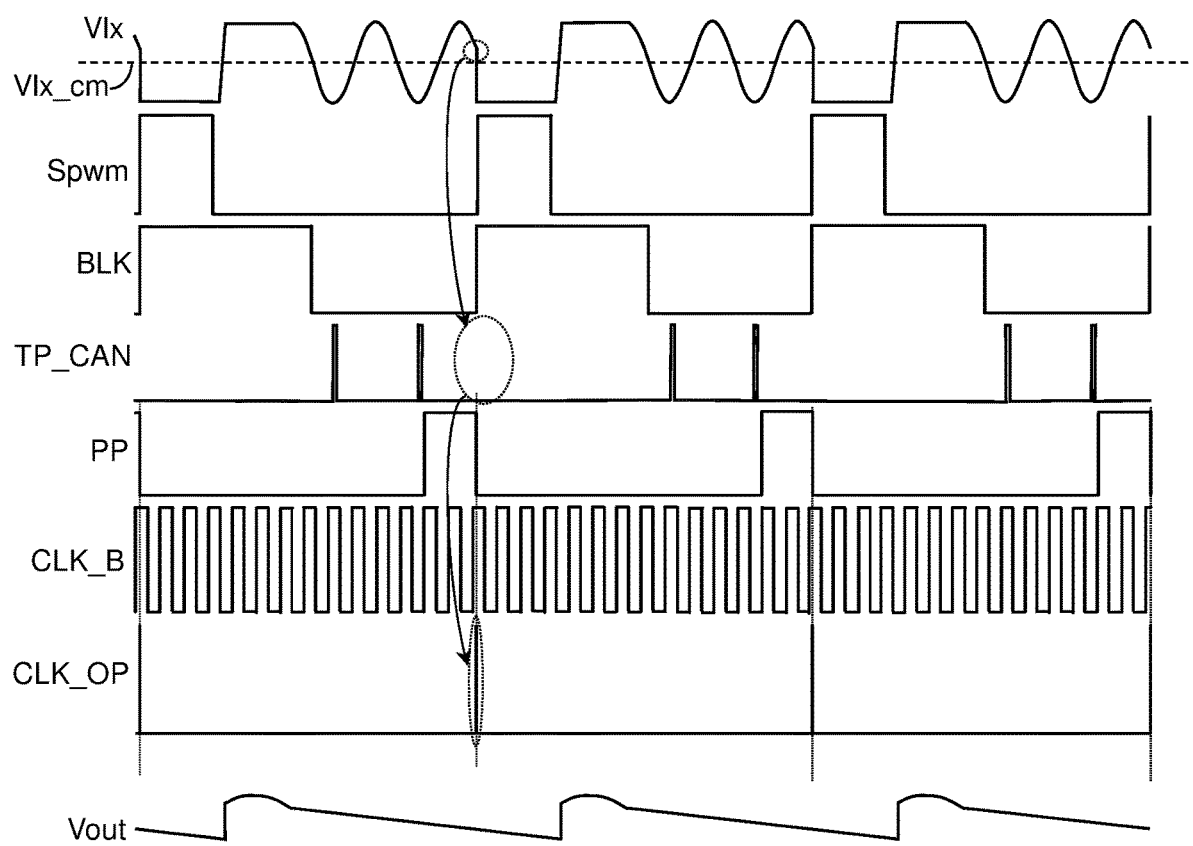
FIG. 15 illustrates a signal waveform diagram depicting relevant signals in a switching regulator according to another embodiment of the present invention.

FIG. 15 illustrates a signal waveform diagram depicting relevant signals in a switching regulator according to another embodiment of the present invention. The phase node voltage Vlx, the common mode voltage Vlx_cm of the phase node voltage Vlx, the PWM signal Spwm, the blanking signal BLK, the time point option signal TP_CAN, the tolerance period signal PP, the base clock signal CLK_B, the operation clock signal CLK_OP and the output voltage Vout are illustrated in FIG. 15. As shown in FIG. 15, when neither a lowest voltage time point nor an available turn-on time point falls within the tolerance period Tpp, the operation clock signal CLK_OP is generated at an ending time point of the tolerance period Tpp.

FIG. 16 is a schematic diagram showing the light load efficiency versus load current of a switching regulator of the present invention and the light load efficiency versus load current of a conventional switching regulator. FIG. 16 demonstrates that, under the same load current, as compared to the prior art, the light load efficiency of the present invention is better.

FIG. 17 to FIG. 29 show flow chart diagrams of a control method of a switching regulator according to an embodiment of the present invention. As shown in FIG. 17, the control method 30 of a switching regulator of the present invention includes: step 301 and step 302. The step 301 includes: generating a time point option signal according to a phase node voltage of the phase node during a ringing period subsequent to a blanking period, to indicate at least one available turn-on time point, or generating a lowest voltage time point signal according to the phase node voltage during a tolerance period, to indicate a lowest voltage time point. Next, the step 302 includes: deciding the tolerance period according to a base clock signal and a tolerable frequency range, and selecting the available turn-on time point or the lowest voltage time point which occurs within the tolerance period as a decided time point, to generate the operation clock signal. As shown in FIG. 18, the control method 30 of the switching regulator of the present invention further includes: step 303. The step 303 includes: generating a blanking signal which defines the blanking period.

In one embodiment, as shown in FIG. 19, the step 303 includes: step 3031 and step 3032. The step 3031 includes: comparing the phase node voltage with a first voltage threshold, to generate a comparison result. Next, the step 3032 includes: deciding the ending time point of the blanking period according to the comparison result and deciding the beginning time point of the blanking period according to the PWM signal, so as to generate the blanking signal.

Figure 20:
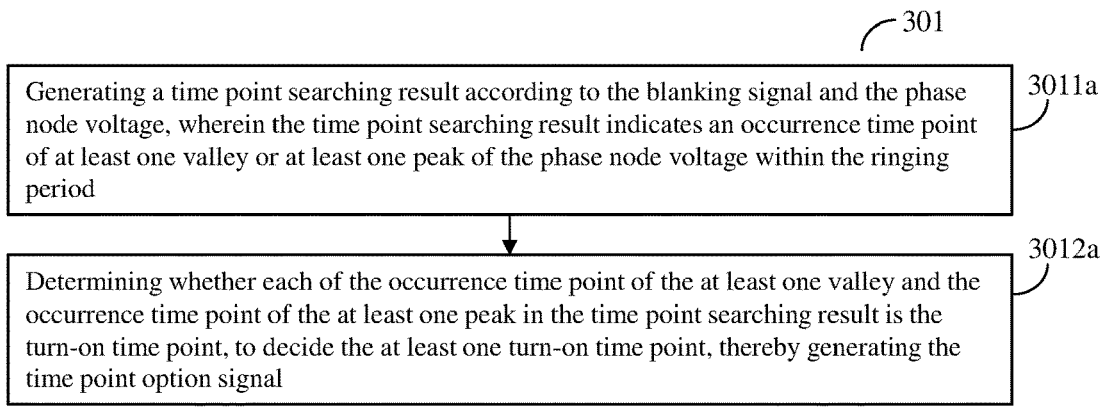

In one embodiment, as shown in FIG. 20, the step 301 includes: step 3011a and step 3012a. The step 3011a includes: generating a time point searching result according to the blanking signal and the phase node voltage, wherein the time point searching result indicates an occurrence time point of at least one valley or at least one peak of the phase node voltage within the ringing period. Next, the step 3012a includes: determining whether each of the occurrence time point of the at least one valley or the at least one peak in the time point searching result is the available turn-on time point, to decide at least one available turn-on time point, thereby generating the time point option signal.

Figure 21:
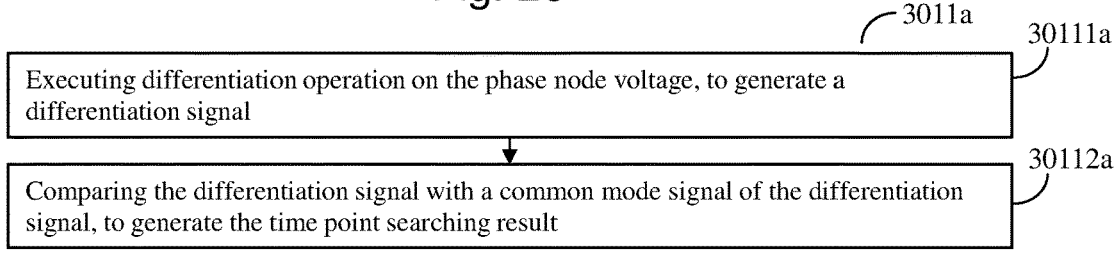

In one embodiment, as shown in FIG. 21, the step 3011a includes: step 30111a and step 30112a. The step 30111a includes: executing a differentiation operation on the phase node voltage, to generate a differentiation signal. Next, the step 30112a includes: comparing the differentiation signal with a common mode signal of the differentiation signal, to generate the time point searching result.

Figure 22:
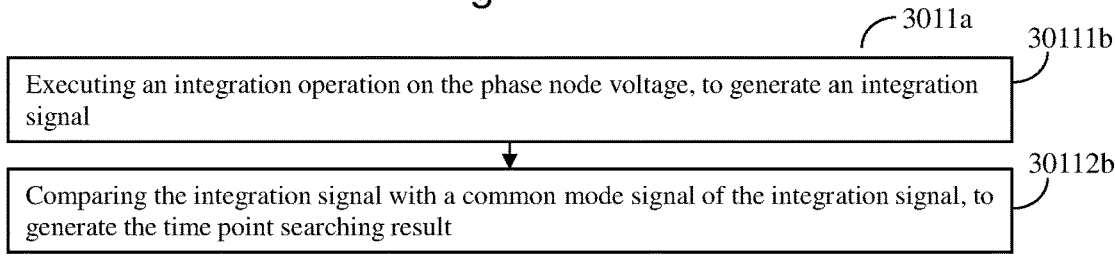

In another embodiment, as shown in FIG. 22, the step 3011a includes: step 30111b and step 30112b. The step 30111b includes: executing an integration operation on the phase node voltage, to generate an integration signal. Next, the step 30112b includes: comparing the integration signal with a common mode signal of the integration signal, to generate the time point searching result.

Figure 23:
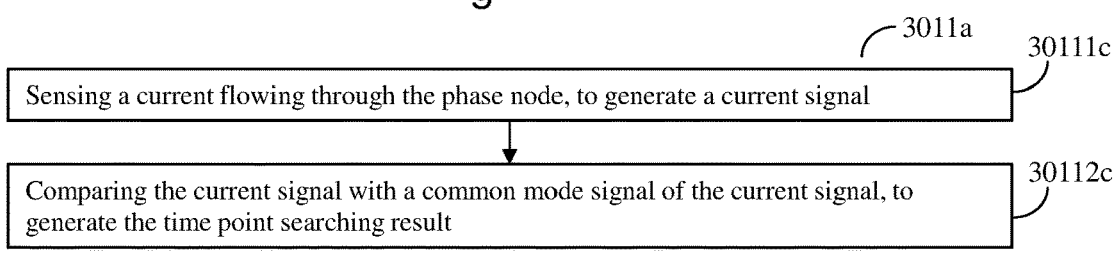

In yet another embodiment, as shown in FIG. 23, the step 3011a includes: step 30111c and step 30112c. The step 30111c includes: sensing a current flowing through the phase node, to generate a current signal. Next, the step 30112c includes: comparing the current signal with a common mode signal of the current signal, to generate the time point searching result.

Figure 24:
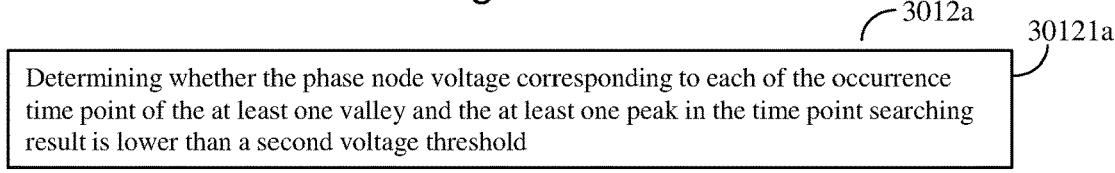
Figure 25:
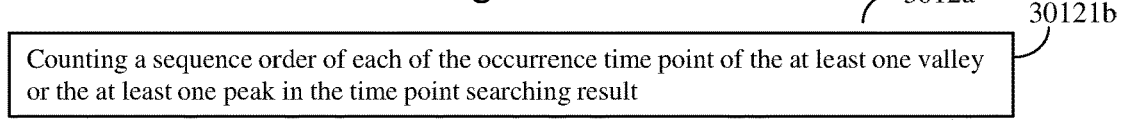

In one embodiment, as shown in FIG. 24, the step 3012a includes: step 30121a. The step 30121a includes: determining whether the phase node voltage corresponding to each of the occurrence time point of the at least one valley or the at least one peak in the time point searching result is lower than a second voltage threshold. In another embodiment, as shown in FIG. 25, the step 3012a includes: step 30121b. The step 30121b includes: counting a sequence order of each of the occurrence time point of the at least one valley or the at least one peak in the time point searching result.

Figure 26:
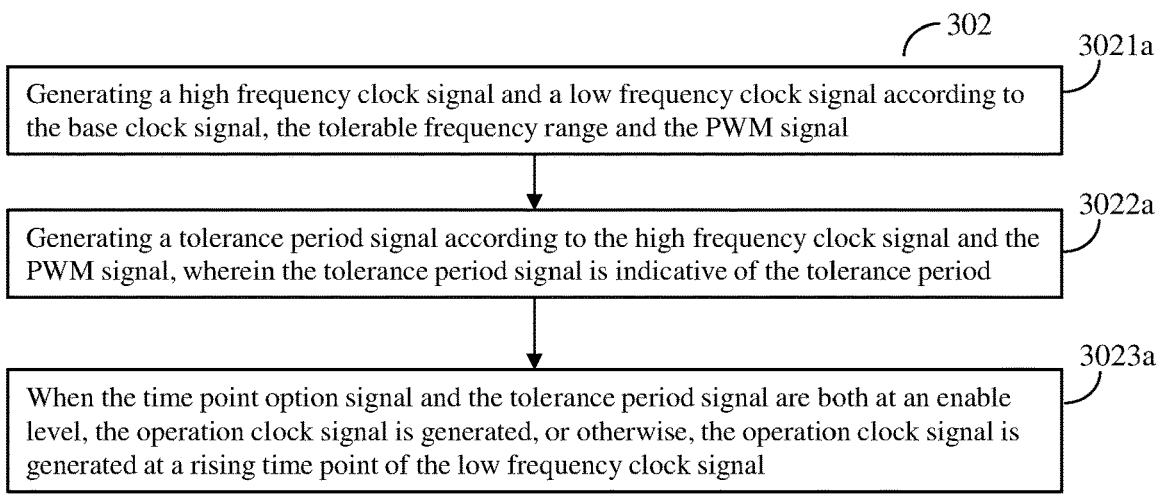
Figure 27:
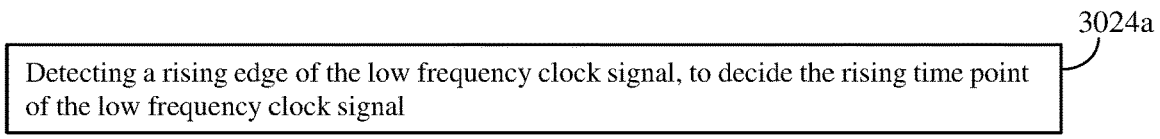

In one embodiment, as shown in FIG. 26, the step 302 includes: step 3021a, step 3022a and step 3023a. The step 3021a includes: generating a high frequency clock signal and a low frequency clock signal according to the base clock signal, the tolerable frequency range and the PWM signal. Next, the step 3022a includes: generating a tolerance period signal according to the high frequency clock signal and the PWM signal, wherein the tolerance period signal is indicative of the tolerance period. Next, the step 3023a includes: when the time point option signal and the tolerance period signal are both at an enable level, the operation clock signal is generated, or otherwise, the operation clock signal is generated at a rising time point of the low frequency clock signal. As shown in FIG. 27, in one embodiment, the step 302 further includes: step 3024a. The step 3024a includes: detecting a rising edge of the low frequency clock signal, to decide the rising time point of the low frequency clock signal.

Figure 28:
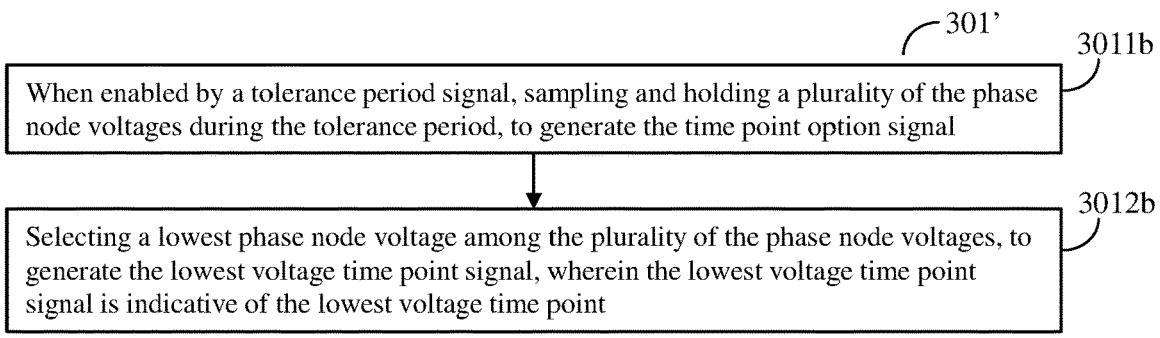

In another embodiment, as shown in FIG. 28, the step 301' includes: step 3011b and step 3012b. The step 3011b includes: when enabled by a tolerance period signal, sampling and holding a plurality of the phase node voltages during the tolerance period, to generate the time point option signal. Next, the step 3012b includes: selecting a lowest phase node voltage among the plurality of the phase node voltages, to generate the lowest voltage time point signal, wherein the lowest voltage time point signal is indicative of the lowest voltage time point.

Figure 29:
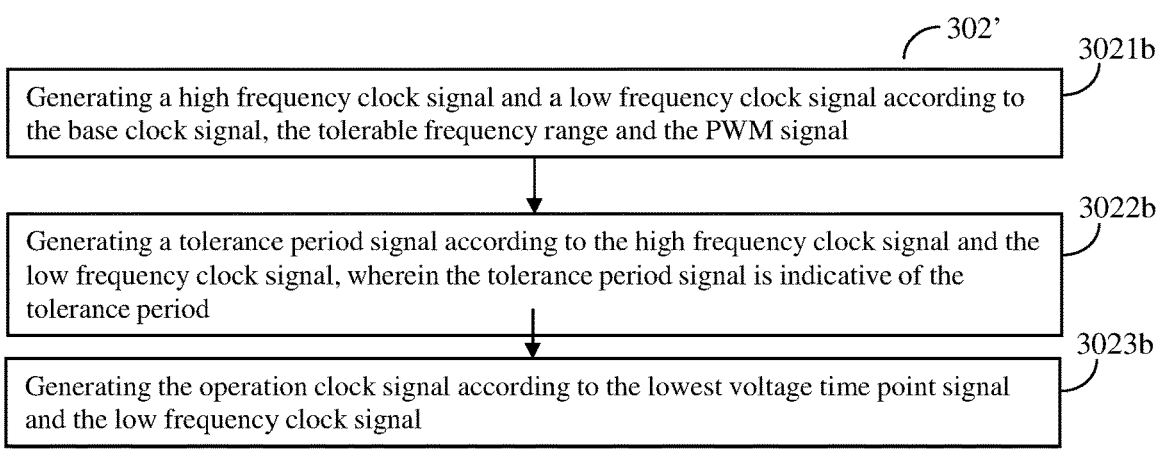

In another embodiment, as shown in FIG. 29, the step 302' includes: step 3021b, step 3022b and step 3023b. The step 3021b includes: generating a high frequency clock signal and a low frequency clock signal according to the base clock signal, the tolerable frequency range and the PWM signal. Next, the step 3022b includes: generating a tolerance period signal according to the high frequency clock signal and the low frequency clock signal, wherein the tolerance period signal is indicative of the tolerance period. Next, the step 3023b includes: generating the operation clock signal according to the lowest voltage time point signal and the low frequency clock signal.

In light of above, on one hand, when a lowest voltage time point or an available turn-on time point falls within the tolerance period, the present invention can adopt the lowest voltage time point or the available turn-on time point as the operation clock signal generation time point; on the other hand, when neither a lowest voltage time point nor an available turn-on time point falls within the tolerance period, the present invention can adopt an ending time point of the tolerance period as the operation clock signal generation time point. By the above-mentioned approach, the present invention can maintain the switching frequency within the tolerance frequency range, and also provide an improved light load efficiency, while keeping the switching regulator to operate by a substantial constant frequency to a certain degree.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching regulator, comprising:
a power stage circuit, which is configured to operably control at least one power switch according to a pulse width modulation (PWM) signal, to switch an inductor coupled to a phase node, thus converting an input voltage to an output voltage;
a control circuit, which is configured to operably generate the PWM signal according to an operation clock signal; and
an operation clock signal generator circuit, which is configured to operably generate the operation clock signal, wherein the operation clock signal generator circuit includes:
a time point option unit, which is configured to operably generate a time point option signal according to a phase node voltage of the phase node during a ringing period subsequent to a blanking period, to indicate at least one available turn-on time point, or which is configured to operably generate a lowest voltage time point signal according to the phase node voltage during a tolerance period, to indicate a lowest voltage time point; and
a time point deciding unit, which is configured to operably decide the tolerance period according to a base clock signal and a tolerable frequency range and which is configured to operably select the available turn-on time point or the lowest voltage time point which occurs within the tolerance period to be a decided time point, so as to generate the operation clock signal;
wherein the decided time point is a time point which corresponds to a lowest phase node voltage within the tolerance period or an ending time point of the tolerance period;
wherein a beginning time point of the tolerance period is a time point obtained by counting a shortest tolerance period from a previous decided time point, wherein the shortest tolerance period corresponds to a highest frequency of the tolerable frequency range;
wherein an ending time point of the tolerance period is a time point obtained by counting a longest tolerance period from a previous decided time point, wherein the longest tolerance period corresponds to a lowest frequency of the tolerable frequency range;

wherein the ringing period occurs during a dead time when the switching regulator operates in a discontinuous conduction mode (DCM).

2. The switching regulator of claim 1, wherein the operation clock signal generator circuit further includes:

a blanking unit, which is configured to operably generate a blanking signal for defining the blanking period, wherein the blanking unit is configured to operably decide a beginning time point of the blanking period according to the PWM signal;

wherein an ending time point of the blanking period is decided by the blanking unit according to the phase node voltage, or the ending time point of the blanking period is decided by selecting a time point prior to the beginning time point of the tolerance period.

3. The switching regulator of claim 1, wherein the available turn-on time point is correlated with a valley time point of a ringing signal of the phase node voltage during the ringing period.

4. The switching regulator of claim 2, wherein the power stage circuit includes a boost power stage circuit, and wherein the output voltage is not lower than 2-fold of the input voltage.

5. The switching regulator of claim 1, wherein the ringing period is correlated with an inductance of the inductor and an equivalent capacitance at the phase node.

6. The switching regulator of claim 2, wherein the blanking unit includes:

a comparison circuit, which is configured to operably compare the phase node voltage with a first voltage threshold, to generate a comparison result; and a logic circuit, which is configured to operably decide the ending time point of the blanking period according to the comparison result and which is configured to operably decide the beginning time point of the blanking period according to the PWM signal, so as to generate the blanking signal.

7. The switching regulator of claim 6, wherein the first voltage threshold includes: a common mode voltage or a knee voltage of the phase node voltage.

8. The switching regulator of claim 2, wherein in a case when the time point option unit is configured to generate the time point option signal according to the phase node voltage of the phase node during the ringing period subsequent to the blanking period, the time point option unit includes:

a time point searching circuit, which is configured to operably generate a time point searching result according to the blanking signal and the phase node voltage, wherein the time point searching result indicates an occurrence time point of at least one valley or at least one peak of the phase node voltage within the ringing period; and a time point determination circuit, which is configured to operably decide whether each of the occurrence time point of the at least one valley or the at least one peak in the time point searching result is the available turn-on time point, so as to decide at least one available turn-on time point, thereby generating the time point option signal;

wherein the time point searching circuit is disabled at the beginning time point of the blanking signal, whereas, the time point searching circuit is enabled at the ending time point of the blanking signal.

9. The switching regulator of claim 8, wherein the time point searching circuit includes:

a differentiator circuit, which is configured to operably execute a differentiation operation on the phase node voltage, to generate a differentiation signal; and a comparison circuit, which is configured to operably compare the differentiation signal with a common mode signal of the differentiation signal, to generate the time point searching result.

10. The switching regulator of claim 8, wherein the time point searching circuit includes:

an integrator circuit, which is configured to operably execute an integration operation on the phase node voltage, to generate an integration signal; and a comparison circuit, which is configured to operably compare the integration signal with a common mode signal of the integration signal, to generate the time point searching result.

11. The switching regulator of claim 8, wherein the time point searching circuit includes:

a current sensing circuit, which is configured to operably sense a current flowing through the phase node, to generate a current signal; and a comparison circuit, which is configured to operably compare the current signal with a common mode signal of the current signal, to generate the time point searching result.

12. The switching regulator of claim 8, wherein the time point determination circuit is configured to operably decide whether each of the occurrence time point of the at least one valley or the at least one peak in the time point searching result is the available turn-on time point according to whether the phase node voltage corresponding to each of the occurrence time point is lower than a second voltage threshold.

13. The switching regulator of claim 12, wherein the second voltage threshold includes: a common mode voltage of the phase node voltage.

14. The switching regulator of claim 8, wherein the time point determination circuit is configured to operably count a sequence order of each of the occurrence time point of the at least one valley or the at least one peak in the time point searching result, so as to decide whether each of the occurrence time point of the at least one valley or the at least one peak in the time point searching result is the available turn-on time point.

15. The switching regulator of claim 14, wherein when the sequence order of the occurrence time point of the at least one valley or the at least one peak is an odd, the time point determination circuit decides this occurrence time point of the at least one valley or the at least one peak is the available turn-on time point.

16. The switching regulator of claim 2, wherein the time point deciding unit includes:

a frequency divider, which is configured to operably generate a high frequency clock signal and a low frequency clock signal according to the base clock signal, the tolerable frequency range and the PWM signal; and a tolerance period generation circuit, which is configured to operably generate a tolerance period signal according to the high frequency clock signal and the PWM signal, wherein the tolerance period signal is indicative of the tolerance period;

wherein when the time point option signal and the tolerance period signal are both at an enable level, the operation clock signal is generated, or otherwise, the operation clock signal is generated at a rising time point of the low frequency clock signal.

17. The switching regulator of claim 16, wherein the time point deciding unit further includes:
an edge detection circuit, which is configured to operably detect a rising edge of the low frequency clock signal, to decide the rising time point of the low frequency clock signal.

18. The switching regulator of claim 1, wherein the power stage circuit includes: a buck power stage circuit, a boost power stage circuit, a buck-boost power stage circuit or a flyback power stage circuit.

19. The switching regulator of claim 7, wherein the common mode voltage of the phase node voltage includes: the input voltage.

20. The switching regulator of claim 9, wherein the common signal includes: the input voltage.

21. The switching regulator of claim 1, wherein in a case when the time point option unit is configured to operably generate the lowest voltage time point signal during the tolerance period, the time point option unit includes:
a sample-and-hold circuit, which is enabled by a tolerance period signal and which is configured to operably sample and hold a plurality of the phase node voltages during the tolerance period, to generate the time point option signal; and
a lowest value selector coupled to the sample-and-hold circuit, wherein the lowest value selector is configured to operably select a lowest phase node voltage among the plurality of the phase node voltages, to generate the lowest voltage time point signal, wherein the lowest voltage time point signal is indicative of the lowest voltage time point.

22. The switching regulator of claim 21, wherein the time point deciding unit includes:
a frequency divider, which is configured to operably generate a high frequency clock signal and a low frequency clock signal according to the base clock signal, the tolerable frequency range and the PWM signal;
a tolerance period generation circuit, which is configured to operably generate a tolerance period signal according to the high frequency clock signal and the PWM signal, wherein the tolerance period signal is indicative of the tolerance period; and
a finite-state machine (FSM), which is configured to operably generate the operation clock signal according to the lowest voltage time point signal and the low frequency clock signal.

23. A control method for controlling a switching regulator, wherein the switching regulator includes: a power stage circuit, which is configured to operably control at least one power switch according to a pulse width modulation (PWM) signal, to switch an inductor coupled to a phase node, thus converting an input voltage to an output voltage; the control method comprising following steps:
generating a time point option signal according to a phase node voltage of the phase node during a ringing period subsequent to a blanking period, to indicate at least one available turn-on time point, or generating a lowest voltage time point signal according to the phase node voltage during a tolerance period, to indicate a lowest voltage time point; and
deciding the tolerance period according to a base clock signal and a tolerable frequency range and selecting the available turn-on time point or the lowest voltage time point which occurs within the tolerance period to be a decided time point, so as to generate the operation clock signal;
wherein the decided time point is a time point which corresponds to a lowest phase node voltage within the tolerance period or an ending time point of the tolerance period;
wherein a beginning time point of the tolerance period is a time point obtained by counting a shortest tolerance period from a previous decided time point, wherein the shortest tolerance period corresponds to a highest frequency of the tolerable frequency range;
wherein an ending time point of the tolerance period is a time point obtained by counting a longest tolerance period from a previous decided time point, wherein the longest tolerance period corresponds to a lowest frequency of the tolerable frequency range.

24. The control method of claim 23, further comprising:
generating a blanking signal which defines the blanking period;
wherein a beginning time point of the blanking period is decided according to the PWM signal, and an ending time point of the blanking period is decided according to the phase node voltage, or the ending time point of the blanking period is decided by selecting a time point prior to the beginning time point of the tolerance period.

25. The control method of claim 23, wherein the available turn-on time point is correlated with a valley time point of a ringing signal of the phase node voltage during the ringing period.

26. The control method of claim 25, wherein the power stage circuit includes a boost power stage circuit, and wherein the output voltage is not lower than 2-fold of the input voltage.

27. The control method of claim 23, wherein the ringing period is correlated with an inductance of the inductor and an equivalent capacitance at the phase node.

28. The control method of claim 24, wherein the step for generating the blanking signal includes:
comparing the phase node voltage with a first voltage threshold, to generate a comparison result; and
deciding the ending time point of the blanking period according to the comparison result and deciding the beginning time point of the blanking period according to the PWM signal, so as to generate the blanking signal.

29. The control method of claim 28, wherein the first voltage threshold includes: a common mode voltage or a knee voltage of the phase node voltage.

30. The control method of claim 24, wherein the step for generating the time point option signal according to the phase node voltage of the phase node during the ringing period subsequent to the blanking period includes:
generating a time point searching result according to the blanking signal and the phase node voltage, wherein the time point searching result indicates an occurrence time point of at least one valley or at least one peak of the phase node voltage within the ringing period; and
determining whether each of the occurrence time point of the at least one valley or the at least one peak in the time point searching result is the available turn-on time point, to decide at least one available turn-on time point, thereby generating the time point option signal.

31. The control method of claim 30, wherein the step for generating the time point searching result according to the blanking signal and the phase node voltage includes:

executing a differentiation operation on the phase node voltage, to generate a differentiation signal; and comparing the differentiation signal with a common mode signal of the differentiation signal, to generate the time point searching result.

32. The control method of claim 30, wherein the step for generating the time point searching result according to the blanking signal and the phase node voltage includes:

executing an integration operation on the phase node voltage, to generate an integration signal; and comparing the integration signal with a common mode signal of the integration signal, to generate the time point searching result.

33. The control method of claim 30, wherein the step for generating the time point searching result according to the blanking signal and the phase node voltage includes:

sensing a current flowing through the phase node, to generate a current signal; and comparing the current signal with a common mode signal of the current signal, to generate the time point searching result.

34. The control method of claim 30, wherein the step for determining whether each of the occurrence time point of the at least one valley or the at least one peak in the time point searching result is the available turn-on time point is determined according to whether the phase node voltage corresponding to each of the occurrence time point of the at least one valley or the at least one peak in the time point searching result is lower than a second voltage threshold.

35. The control method of claim 34, wherein the second voltage threshold includes: a common mode voltage of the phase node voltage.

36. The control method of claim 30, wherein the step for determining whether each of the occurrence time point of the at least one valley or the at least one peak in the time point searching result is the available turn-on time point includes:

counting a sequence order of each of the occurrence time point of the at least one valley or the at least one peak in the time point searching result.

37. The control method of claim 36, wherein when the sequence order of the occurrence time point of the at least one valley or the at least one peak is an odd, deciding this occurrence time point is the available turn-on time point.

38. The control method of claim 24, wherein the step for deciding the tolerance period according to the base clock signal and the tolerable frequency range and selecting the available turn-on time point or the lowest voltage time point which occurs within the tolerance period to be the decided time point to generate the operation clock signal includes:

generating a high frequency clock signal and a low frequency clock signal according to the base clock signal, the tolerable frequency range and the PWM signal; and generating a tolerance period signal according to the high frequency clock signal and the low frequency clock signal, wherein the tolerance period signal is indicative of the tolerance period;

wherein when the time point option signal and the tolerance period signal are both at an enable level, the operation clock signal is generated, or otherwise, the operation clock signal is generated at a rising time point of the low frequency clock signal.

39. The control method of claim 38, wherein the step for deciding the tolerance period according to the base clock signal and the tolerable frequency range and selecting the available turn-on time point or the lowest voltage time point which occurs within the tolerance period to be the decided time point to generate the operation clock signal includes:

detecting a rising edge of the low frequency clock signal, to decide the rising time point of the low frequency clock signal.

40. The control method of claim 23, wherein the power stage circuit includes: a buck power stage circuit, a boost power stage circuit, a buck-boost power stage circuit or a flyback power stage circuit.

41. The control method of claim 29, wherein the common mode voltage of the phase node voltage includes: the input voltage.

42. The control method of claim 31, wherein the common signal includes: the input voltage.

43. The control method of claim 23, wherein the step for generating the lowest voltage time point signal according to the phase node voltage during the tolerance period includes:

When being enabled by a tolerance period signal, sampling and holding a plurality of the phase node voltages during the tolerance period, to generate the time point option signal; and selecting a lowest phase node voltage among the plurality of the phase node voltages, to generate the lowest voltage time point signal, wherein the lowest voltage time point signal is indicative of the lowest voltage time point.

44. The control method of claim 43, wherein the step for deciding the tolerance period according to the base clock signal and the tolerable frequency range and selecting the available turn-on time point or the lowest voltage time point which occurs within the tolerance period to be the decided time point to generate the operation clock signal includes:

generating a high frequency clock signal and a low frequency clock signal according to the base clock signal, the tolerable frequency range and the PWM signal;

generating a tolerance period signal according to the high frequency clock signal and the low frequency clock signal, wherein the tolerance period signal is indicative of the tolerance period; and generating the operation clock signal according to the lowest voltage time point signal and the low frequency clock signal.

* * * * *